US011351893B2

(12) United States Patent
Dillinger

(10) Patent No.: US 11,351,893 B2
(45) Date of Patent: Jun. 7, 2022

(54) FLOATING SEAT

(71) Applicant: ADIENT ENGINEERING AND IP GMBH, Burscheid (DE)

(72) Inventor: Thomas Dillinger, Ratingen (DE)

(73) Assignee: Adient US LLC, Plymouth, MI (US)

( * ) Notice: Subject to any disclaimer, the term of this patent is extended or adjusted under 35 U.S.C. 154(b) by 89 days.

(21) Appl. No.: 17/044,357

(22) PCT Filed: Apr. 3, 2019

(86) PCT No.: PCT/EP2019/058381
§ 371 (c)(1),
(2) Date: Oct. 1, 2020

(87) PCT Pub. No.: WO2019/193040
PCT Pub. Date: Oct. 10, 2019

(65) Prior Publication Data
US 2021/0213855 A1 Jul. 15, 2021

(30) Foreign Application Priority Data

| Apr. 4, 2018 | (DE) | 10 2018 205 058.9 |
| Apr. 4, 2018 | (DE) | 10 2018 205 076.7 |
| Jun. 29, 2018 | (DE) | 10 2018 210 716.5 |

(51) Int. Cl.
*B60N 2/14* (2006.01)
*B60N 2/10* (2006.01)
(Continued)

(52) U.S. Cl.
CPC .............. *B60N 2/146* (2013.01); *B60N 2/10* (2013.01); *B60N 2/14* (2013.01); *B60N 2/4249* (2013.01);
(Continued)

(58) Field of Classification Search
None
See application file for complete search history.

(56) References Cited

U.S. PATENT DOCUMENTS 5,882,060 A * 3/1999 Walk .................... B60N 2/4279
296/65.01
8,360,368 B2 1/2013 Bertrand et al.
(Continued)

FOREIGN PATENT DOCUMENTS

| DE | 845606 C | 8/1952 |
| DE | 7527447 U | 10/1976 |

(Continued)

OTHER PUBLICATIONS

European Patent Office, International Search Report with Written Opinion, issued in PCT/EP2019/058381, dated Jun. 5, 2019, 11 pages, European Patent Office, Rijswijk, Netherlands.

*Primary Examiner* — David E Allred
(74) *Attorney, Agent, or Firm* — Marshall & Melhorn, LLC

(57) ABSTRACT

A seating system for at least one occupant in a vehicle interior is disclosed. The seating system may provide a seat assembly with a base assembly configured to be mounted in the vehicle interior and a seat structure configured to be coupled to the base assembly and providing a seat configured for movement relative to the base assembly. Movement of the seat relative to the base assembly may be made by at least two of recline movement or swivel movement or tilt movement. Recline movement may be generally translating movement of the seat structure. Swivel movement may be rotational movement of the seat structure. Tilt movement may be generally translating movement of the seat structure transverse to recline movement. The base assembly may be
(Continued)

a mechanism configured to facilitate movement of the seat structure relative to the base assembly.

14 Claims, 17 Drawing Sheets

(51) Int. Cl.
*B60N 2/42* (2006.01)
*B60N 2/427* (2006.01)
*B60N 2/02* (2006.01)

(52) U.S. Cl.
CPC ............ *B60N 2/4279* (2013.01); *B60N 2/43* (2013.01); *B60N 2002/022* (2013.01); *B60N 2002/0204* (2013.01); *B60N 2002/0212* (2013.01); *B60N 2002/0216* (2013.01)

(56) References Cited

U.S. PATENT DOCUMENTS

| | | | |
|---|---|---|---|
| 9,428,088 B1 * | 8/2016 | Rajasingham | B60N 2/42709 |
| 10,195,964 B2 | 2/2019 | Martin | |
| 2006/0192052 A1 * | 8/2006 | Baumann | B64D 11/06 244/122 R |
| 2018/0178690 A1 * | 6/2018 | Castillo | B60N 2/0244 |
| 2019/0359087 A1 | 11/2019 | Galan Garcia et al. | |

FOREIGN PATENT DOCUMENTS

| | | |
|---|---|---|
| DE | 2642941 A1 | 3/1978 |
| DE | 4337019 A1 | 5/1995 |
| DE | 102014201633 A1 | 7/2015 |
| DE | 102017208601 A1 | 11/2018 |
| EP | 2146899 A1 | 1/2010 |
| ES | 2184564 A1 | 4/2003 |
| WO | 2018/049228 A1 | 3/2018 |

* cited by examiner

FLOATING SEAT

BACKGROUND OF THE INVENTION

The invention relates to a floating seat, in particular lockable floating seat for a vehicle, in particular a vehicle seat which can be inclined relative to a body floor.

Floating seats are known in the prior art for maximizing the comfort. In general, a locking mechanism needs a few seconds to lock or unlock the floating seat.

In addition, an adjustment of the seat during the journey is undesirable for safety reasons.

SUMMARY OF THE INVENTION

It is the object of the present invention to specify a floating seat with improved comfort and better safety.

The object is achieved according to the invention with a floating seat, comprising a base or carrier element and a seat shell, wherein an adjustment mechanism in the manner of a spherical plain bearing or plain bearing, in particular a ball and socket joint plain bearing or split plain bearing, is formed between the seat shell and the base element, wherein the seat shell is adjustable by means of the adjustment mechanism in at least two or all three degrees of rotational freedom relative to the base element.

The object is achieved according to the invention with a floating seat, comprising a base or carrier element, an adapter element and a seat shell, wherein an adjustment mechanism in the manner of a spherical plain bearing or plain bearing, in particular a ball and socket joint plain bearing or split plain bearing or multiple-surface plain bearing, is in each case formed at least between the seat shell and the adapter element and/or between the adapter element and the base element, wherein the seat shell is adjustable by means of the adjustment mechanism in at least two or in all three degrees of rotational freedom relative to the base element.

One aspect makes provision for the seat shell to be inclinable relative to the base element at least about a transverse axis and to be rotatable about a vertical axis by means of the adjustment mechanism.

In one possible embodiment, the seat shell is inclinable relative to the base element in the longitudinal direction about a transverse axis within a range of between 0° and 120° and/or is inclinable or rollable in the transverse direction about a longitudinal axis within a range of between 0° and 5°, and/or is rotatable or pivotable about a vertical axis of the floating seat at maximum by up to 20°. For example, in a design position or seat position, the seat shell takes up a position in which the seat shell is oriented forward in the longitudinal direction and therefore in the travel/viewing direction. This position is also referred to as the 0° position with respect to the vertical axis (Z axis) and longitudinal axis (X axis). In said design position or seat position, the seat shell is inclined rearward, for example by 25°, about the transverse axis (Y axis) for improved seat comfort. The seat shell is inclinable by means of the plain bearing in relation to the design position or seat position for example forward by up to 10° about the transverse axis and up to 20° rearward. The seat shell is inclinable at maximum about the transverse axis by up to 120°. The seat shell is in particular rotatable about the vertical axis at maximum by up to 280°, in particular is rotatable by −90° to up to +190° with respect to the design position or seat position.

In one possible embodiment, the plain bearing is designed as a split plain bearing or multiple-surface plain bearing. For example, the plain bearing comprises a plurality of separate sliding surfaces which are arranged and/or shaped in such a manner that a plain bearing in the form of a spherical shell is formed between the base element and the seat shell. For example, the base element here comprises a plurality of partial sliding surfaces which are shaped in the form of a spherical shell and are arranged distributed on the base element. The seat shell has an individual sliding surface or a plurality of sliding surfaces corresponding to said partial sliding surfaces and in the form of a spherical shell. Alternatively, the base element and the seat shell can each have an individual sliding surface formed in a manner corresponding to one another, for example in the form of a spherical shell.

In the unlocked state, the seat shell is thus movable, in particular pivotable or inclinable, in a plurality of degrees of freedom, in particular in all degrees of rotational freedom. In the locked state, the seat shell is blocked.

The object is achieved according to the invention with a floating seat, comprising a base or carrier element, an optional adapter element and a seat shell, wherein a locking mechanism is provided for locking and/or unlocking an adjustment of the seat shell relative to the base element, wherein the locking mechanism is actuable by means of a triggering mechanism, and wherein the triggering mechanism is configured to manually or electrically actuate the locking mechanism during normal operation in order to unlock or lock the adjustment of the seat shell relative to the base element and, optionally or additionally, to automatically actuate same in the event of a collision, in order to automatically lock the adjustment of the seat shell relative to the base element.

The locking mechanism is designed as a continuous or infinitely variable lock or detent, in particular during normal operation.

In particular, the locking mechanism is actuable during normal operation continuously or in an infinitely variable manner by means of the triggering mechanism, for example by means of an electric motor, in particular is movable between an unlocked position and a locked position, or vice versa.

For this purpose, the locking mechanism has, for example, an electromechanical drive unit which interacts with a brake unit, for example a wedge brake unit. The electromechanical drive unit is designed here to brake and/or to lock or to unlock an adjustment of the seat shell relative to the base element in the longitudinal direction and in the vertical direction. The brake unit, in particular a wedge brake unit, is configured to brake and/or to stop, in particular to lock or to unlock, an adjustment of the seat shell relative to the base element in the transverse direction and in the vertical direction.

In one possible embodiment, the electromechanical drive unit is designed as a motor transmission unit, for example a drive motor in combination with a spindle drive.

The brake unit comprises, for example, opposed brake, wedge and/or friction surfaces. For example, a brake surface has a spherical shape which slides on a brake, sliding or guide surface inclined in an opposed manner with respect thereto, and is thereby braked.

In the event of a collision, the locking mechanism is actuable by means of the triggering mechanism automatically and continuously or in an infinitely variable manner, for example by means of a pyrotechnic propellant, in particular is movable into a locked position.

The floating seat is designed in such a manner that a position of the seat shell relative to the base element is settable in at least two or more degrees of freedom, in particular in at least one or more degrees of translation freedom, such as, for example, in the vertical direction or longitudinal direction, and/or in at least one or more degrees of rotational freedom, for example in the vertical direction of rotation or horizontal direction of rotation about a vertical, longitudinal and/or transverse axis. For this purpose, for example, an adjustment mechanism is provided. By setting the position of the seat shell in more than two degrees of freedom, in particular degrees of rotational freedom, the impression is produced of a floating or sliding seat shell which follows a movement of a user on the seat. The adjustment mechanism is designed, for example, in the manner of a spherical plain bearing or plain bearing, in particular a ball and socket joint or a ball bearing. For example, the spherical plain bearing or plain bearing has a spherical sliding surface in which a spherical running surface slides. The spherical sliding surface is formed here on the base element in the direction of the seat shell, wherein the seat shell itself and/or the adapter element has a running surface corresponding to the spherical sliding surface on the base element, or vice versa.

For example, the spherical sliding surface has a concave shape and the spherical running surface has a convex shape corresponding thereto.

The spherical plain bearing or plain bearing may also be designed as a self-aligning bearing or split plain bearing. The self-aligning bearing here has, for example, a self-aligning or swinging or sliding shell or a ball and socket joint socket in which a joint head or a spherical shell slides. In the unlocked state, the seat shell is thus movable, in particular pivotable or inclinable, in a plurality of degrees of freedom. In the locked state, the seat shell is blocked.

The locking mechanism is designed in particular as a mechanical connection, for example a latching connection, a plug-in connection or another suitable form-fitting or force-fitting connection, in particular frictional connection. For example, the locking and/or braking mechanism is designed as a plug-in and/or latching connection. Alternatively or additionally, the locking and/or braking mechanism may be designed as a force-fitting connection, in particular frictional connection.

In one possible embodiment, the triggering mechanism comprises an electric motor or servomotor for electrically actuating the locking mechanism of the seat. According to a further aspect, the electric motor for actuating the locking mechanism drives a locking element directly or drives the locking element indirectly via a threaded rod, the locking element being designed, for example, as a carriage, in particular a wedge plate or latching plate, such that said locking element passes into or out of locking engagement, depending on the direction of movement.

In a further embodiment, the triggering mechanism comprises a pyrotechnic propellant in order to automatically trigger the locking mechanism and adjust same into a locking position.

In one development, the pyrotechnic propellant is in the form of a pyrotechnic actuator which advances a piston which moves a locking element, in particular a wedge plate or latching plate, such that said locking element is adjusted into a locking position.

The advantages achieved with the invention consist in particular in that, during normal operation, the seat shell is pivotable, in particular movable, by means of just one operation and, in the event of a collision, the seat shell is lockable against movement within milliseconds.

BRIEF DESCRIPTION OF THE DRAWINGS

Exemplary embodiments of the invention are explained in more detail with reference to drawings, in which.

Mutually corresponding parts are provided with the same reference signs throughout the figures.

DETAILED DESCRIPTION

Figure 1A:
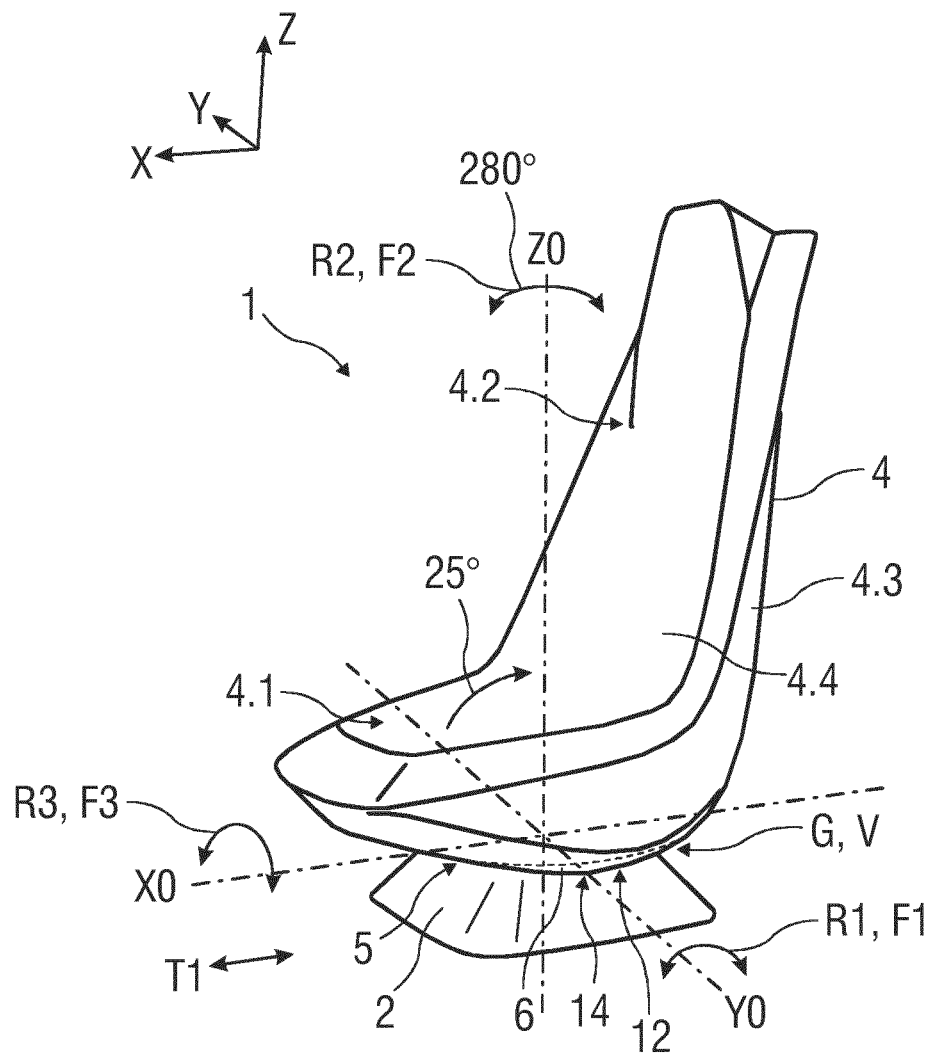
FIGS. 1A and 1B are schematic illustrations in different perspectives of a pivoting or floating seat.
Figure 1B:
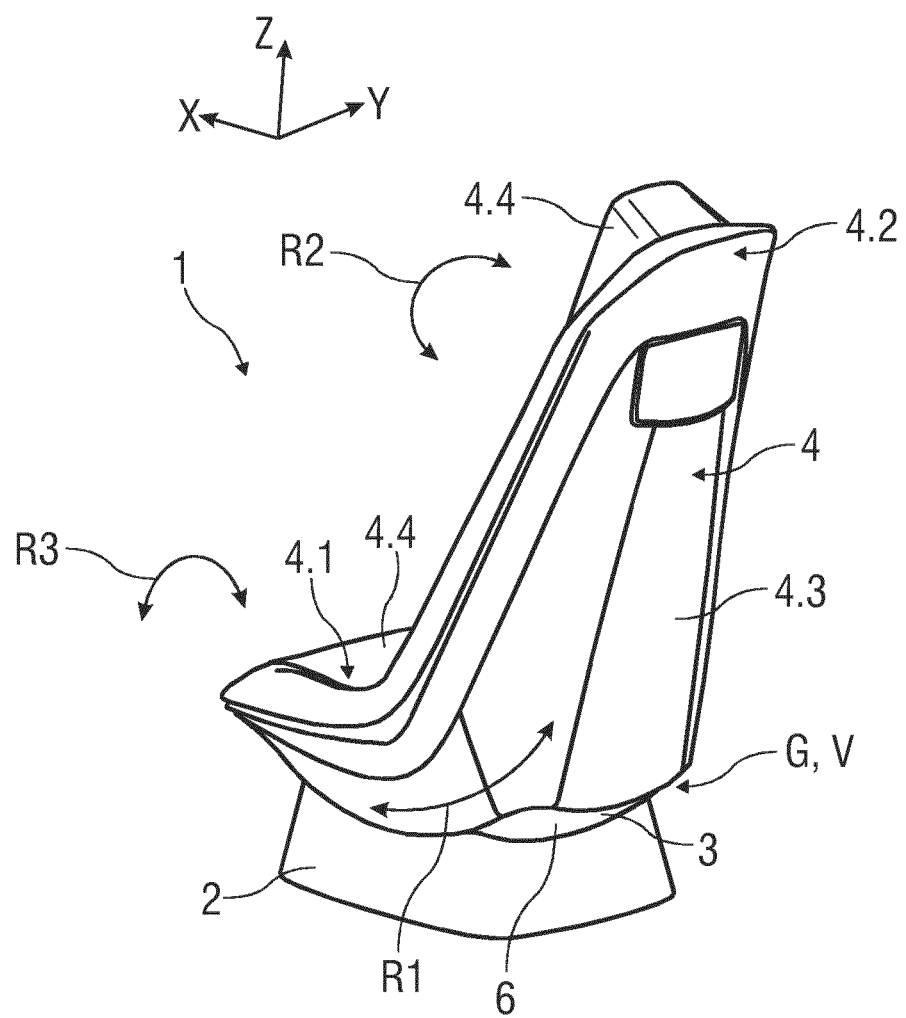

FIGS. 1A and 1B show two schematic perspective illustrations of a pivoting or floating seat 1, obliquely from the front, and a pivoting or floating seat 1, obliquely from behind, in particular a vehicle seat which is movable, in particular is pivotable, rotatable and/or inclinable, in particular in a plurality of degrees of freedom F1 to F3. The floating seat 1 is provided in particular in a vehicle and is fastened there to a vehicle floor in a manner not illustrated specifically.

The floating seat 1 comprises at least one carrier or base element 2, an optional adapter element 3 and a seat shell 4 (FIG. 1B). Instead of the optional adapter element 3, the seat shell 4 can be correspondingly shaped and designed and can be arranged and mounted directly on the base element 2

(FIG. 1A). In a further alternative (not illustrated), the adapter element 3 can be part of the base of the seat shell 4.

Furthermore, the seat shell 4 can be formed integrally from a seat part 4.1 and a seat back 4.2. Alternatively, the seat shell 4 can be formed from a separate seat part 4.1 and a seat back 4.2 (not illustrated specifically) which is arranged inclinable on the latter. The seat shell 4 can furthermore be formed from a carrier 4.3, in particular a rigid foam shell or composite shell, in particular made of a fiber-reinforced plastic, and a cushion element 4.4 arranged thereon, in particular a foam cushion with or without a cover.

An adjustment mechanism 6 in the manner of a spherical plain bearing or plain bearing G is in each case formed between seat shell 4 and base element 2 (FIG. 1A) and/or between adapter element 3 and base element 2 (FIG. 1B). The seat shell 4 is therefore mounted on the base element 2 directly or indirectly via the adapter element 3 in a sliding, in particular inclinable, rotatable and/or pivotable, manner. By means of the adjustment mechanism 6, the seat shell 4 is mounted in a sliding manner relative to the base element 2 for the adjustment V in at least two or all three degrees of rotational freedom R1, R2 and/or R3.

For example, in a design position or seat position P1, the seat shell 4 takes up a position in which the seat shell 4 is oriented forward in the longitudinal direction X and thus in the travel/viewing direction. This seat position P1 is also referred to as the 0° position with respect to the vertical axis Z0 and longitudinal axis X0. In this seat position P1, the seat shell 4 is inclined rearward, for example by 25°, about the transverse axis Y0 for improved seat comfort. The plain bearing G is configured here in such a manner that the seat shell 4 in relation to the design position or seat position P1 is inclinable, for example, about the transverse axis Y0 forward by up to 10° and rearward by up to 20° and is inclinable rearward at a maximum by up 120° and/or is rotatable about the vertical axis Z0 in particular at a maximum by up to 280°, in particular is rotatable by −90° up to +190°.

The adjustment mechanism 6 is designed, for example, in the manner of a split plain bearing 6.1. The adjustment mechanism 6 can also be designed in the manner of a ball and socket joint.

In a further embodiment of the floating seat 1, the latter comprises a carrier or base element 2, an adapter element 3 and a seat shell 4, wherein an adjustment mechanism 6 in the form of a plain bearing G, in particular a ball and socket joint or a split plain bearing, is in each case formed at least between the seat shell 4 and the adapter element 3 and between the adapter element 3 and the base element 2, and the seat shell 4 is adjustable (not illustrated specifically) by means of such a multiple adjustment mechanism 6 in at least two or all three degrees of rotational freedom R1, R2 and/or R3 relative to the base element 2.

For example, the seat shell 4 is inclinable relative to the base element 2 about a transverse axis Y0 from a normal position into a comfort position within a range of between 0° and 120° and/or is inclinable about a longitudinal axis X0 within a range of between 0° and 5° and/or is rotatable about a vertical axis Z0 at a maximum by up to 20°.

In other words: the floating seat 1 is designed in such a manner that a position of the seat shell 4 relative to the base element 2 is settable in at least two or more degrees of freedom F1 to F3, in particular in at least one or more degrees of translation freedom T1, T2, such as, for example, in the vertical direction Z and/or longitudinal direction X, and/or in at least one or more of the degrees of rotational freedom R1, R2, R3. For this purpose, the adjustment mechanism 6 is provided. By means of the setting of the position of the seat shell 4 in more than two degrees of freedom F1 to F3, the impression is produced of a floating or sliding seat shell 4 which follows a movement of a user on the floating seat 1.

In order to lock the seat shell 4 in a position which has been set, a locking mechanism 5 is provided which fixes the seat shell 4 in the position set relative to the base element 2. The locking mechanism 5 is described in more detail below with reference to examples. In one possible embodiment, the locking mechanism 5 can be arranged in the adapter element 3.

For example, the locking mechanism 5 comprises an electromechanical drive unit 12 which interacts with a brake unit 14 which engages between the seat shell 4 and the base element 2.

Figure 1C:
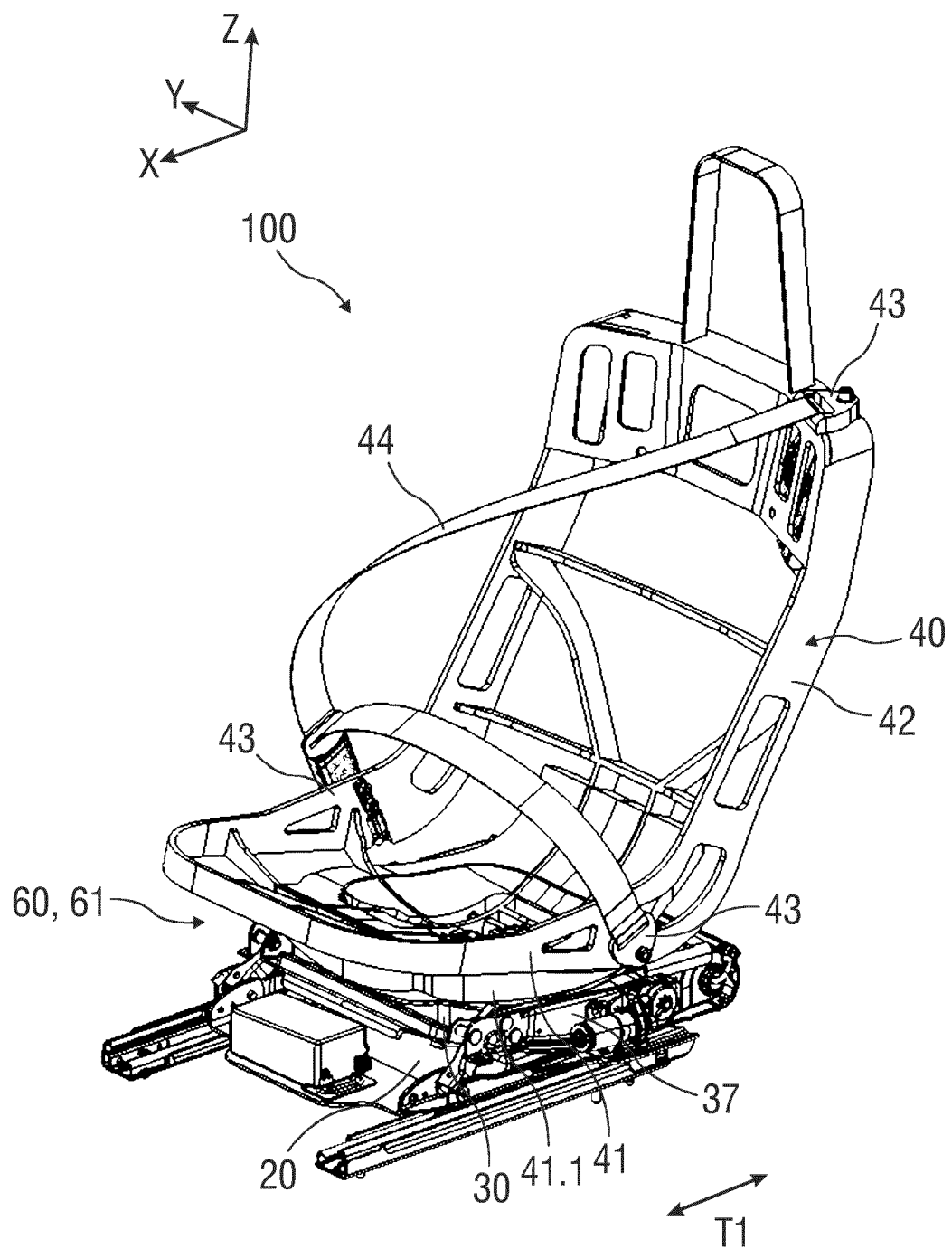
FIGS. 1C to 1E show a schematic perspective illustration of an embodiment of a floating seat without upholstery with a seat shell in the form of a spherical shell and with an adapter element with a plurality of sliding surfaces.
Figure 1D:
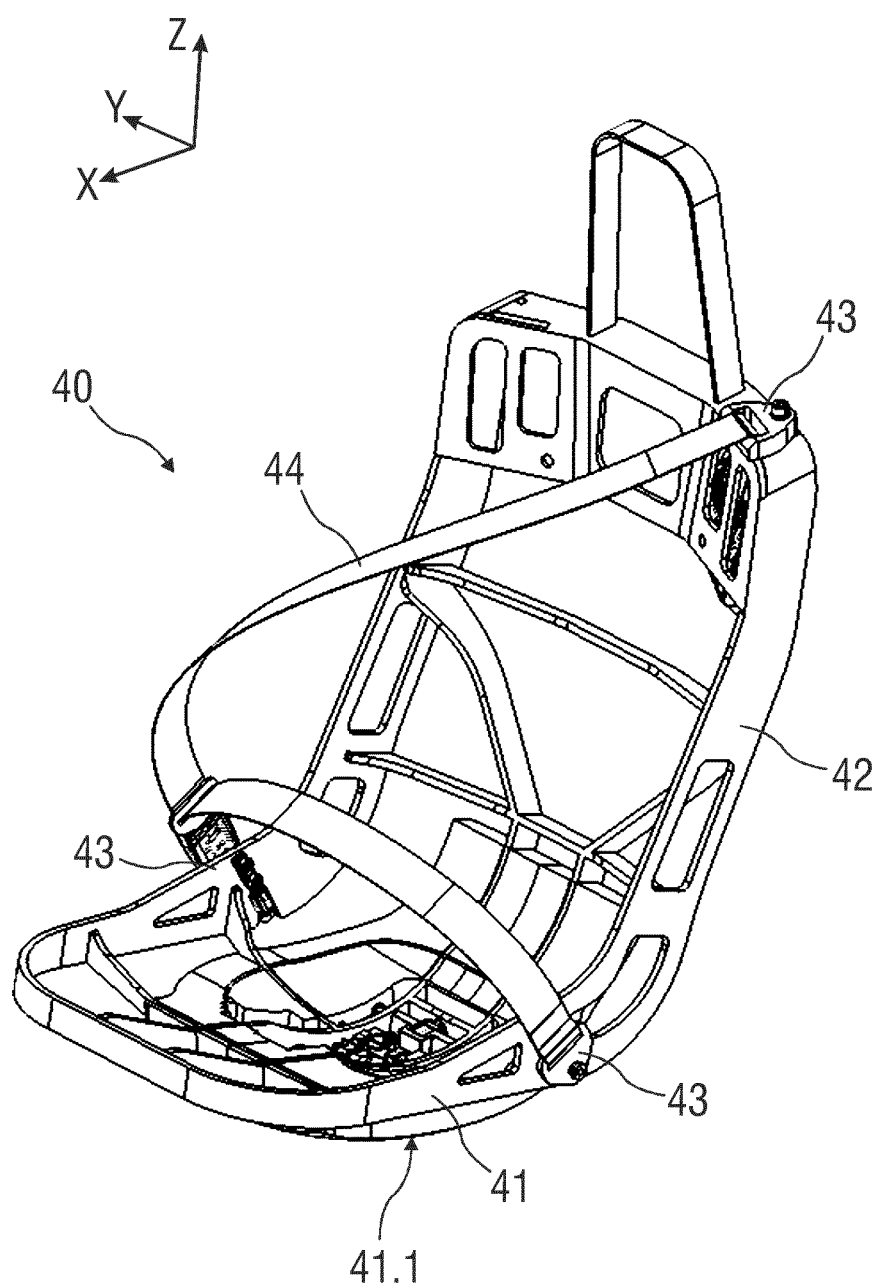
Figure 1E:
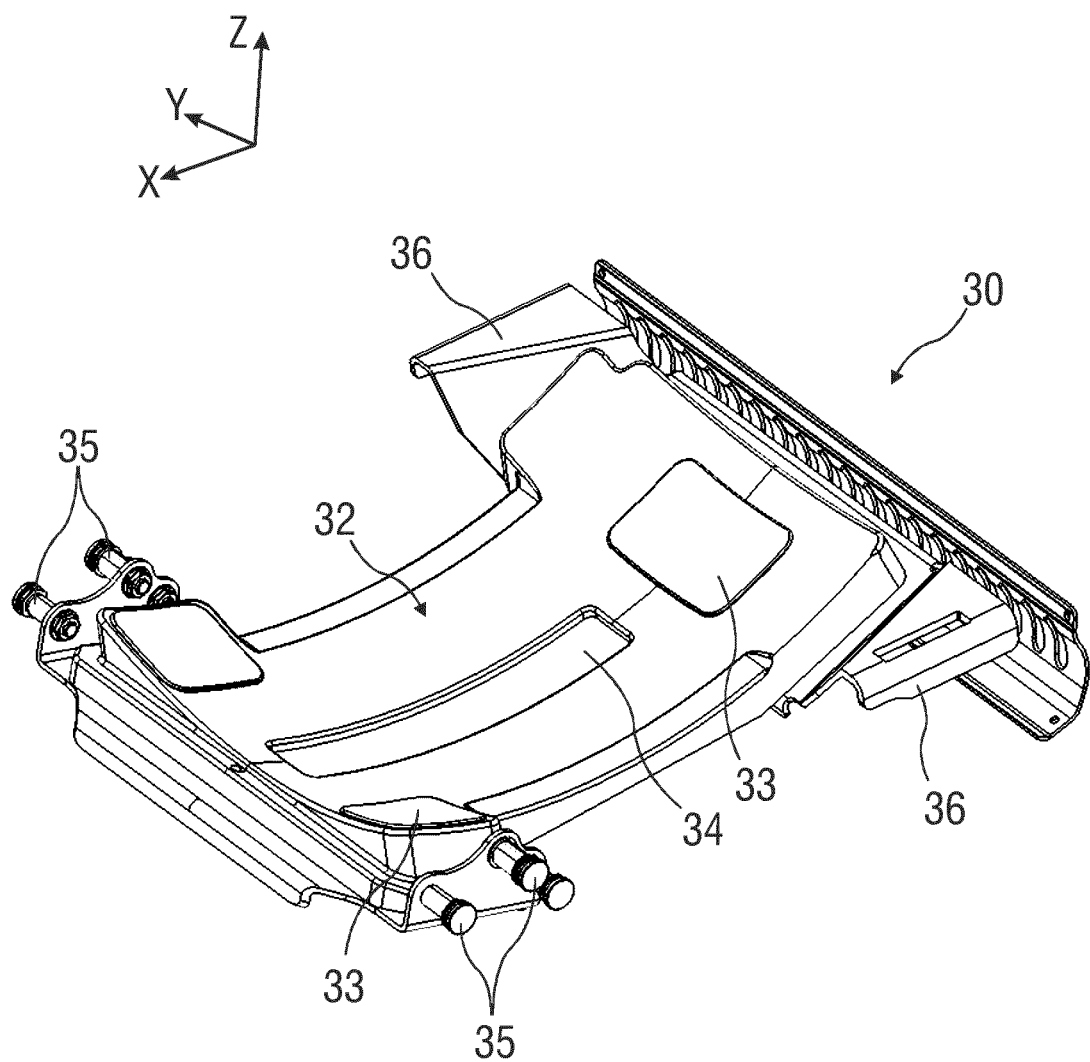

FIGS. 1C to 1E show a schematic perspective illustration of a further exemplary embodiment of a floating seat 100, of upholstery with a seat shell 40 and with an adapter element 30, between which a multiple-surface plain bearing 61 is formed as the adjustment mechanism 60 (illustrated in FIG. 1C).

The further components, not shown specifically in FIGS. 1C to 1E, for the variable adjustment of the floating seat 100 relative to a vehicle floor in at least two degrees of rotational freedom R1 to R3, such as the base element 2, the locking mechanism 5, the drive unit 12 and the brake unit 14, correspond to the components which are illustrated in FIGS. 1A to 1B and 2 to 11 and are correspondingly described above or below.

The adapter element 30 is fastened to the base element 20, in particular to a lateral seat frame 37, by means of fastening bolts 35 and/or fastening flanges 36.

FIGS. 1C and 1D show the seat shell 40 with a seat part 41 which has a sliding surface 41.1 in the form of a spherical shell in the direction of the adapter element 30. The sliding surface 41.1 is designed in the form of a spherical shell. The sliding surface 41.1 can be divided, for example, into a plurality of partial sliding surfaces. Alternatively, said sliding surface can be designed as an individual concavely shaped surface or a concavely shaped surface with a plurality of partial sliding surfaces.

The seat shell 40 is designed as a single-part frame shell 42, in particular an injection molded frame shell or a shell produced in another suitable molding process.

In order to permit both a variable adjustment of the floating seat 100 relative to a vehicle floor in at least two degrees of rotational freedom R1 to R3 and sufficient safety for a user of the floating seat 100, a corresponding number of attachment points 43 for a seat belt 44, for example three attachment points 43 for a three-point belt, are arranged on the frame shell 42 itself.

FIG. 1E shows an exemplary embodiment of the adapter element 30. The adapter element 30 has a concave surface form 32 which faces in the direction of the seat shell 40, in particular the seat part 41. The concave surface form 32 has a plurality of partial sliding surfaces 33. The partial sliding surfaces 33 are in the form of spherical shells or are shaped concavely. The partial sliding surfaces 33 form spot mountings for the corresponding sliding surface 41.1 of the seat part 41 or of the partial sliding surfaces (not illustrated) thereof. The partial sliding surfaces 33 are manufactured from a different material than the material of the adapter element 30, in particular from a suitable sliding material, such as, for example, a plastic, graphite, carbon or EPDM. The sliding material has in particular a low coefficient of sliding friction, high wear resistance and high mechanical load-bearing capacity and also dimensional stability and temperature resistance. The mutually opposite surfaces forming the plain bearing G—partial sliding surfaces 33 of the adapter element 30 and sliding surface 41.1 of the seat shell 40—can also be formed from different materials. For example, one of the surfaces is formed from a particularly hard material with a high modulus of elasticity and the other from a soft material with a low modulus of elasticity.

The partial sliding surfaces 33 are applied spaced apart from one another on the adapter element 30 facing towards the seat shell 40.

In addition, the adapter element 30 has a recess 34 through which the brake unit 14 and the locking mechanism 5 engage for braking the movement of the seat shell 40 relative to the adapter element 30 as far as locking the seat shell 40 and the adapter element 30 and therefore moving or positioning the floating seat 100 relative to the base element 20 in a set position. The brake unit 14 and the locking mechanism 5 are described in more detail below.

Figure 2:
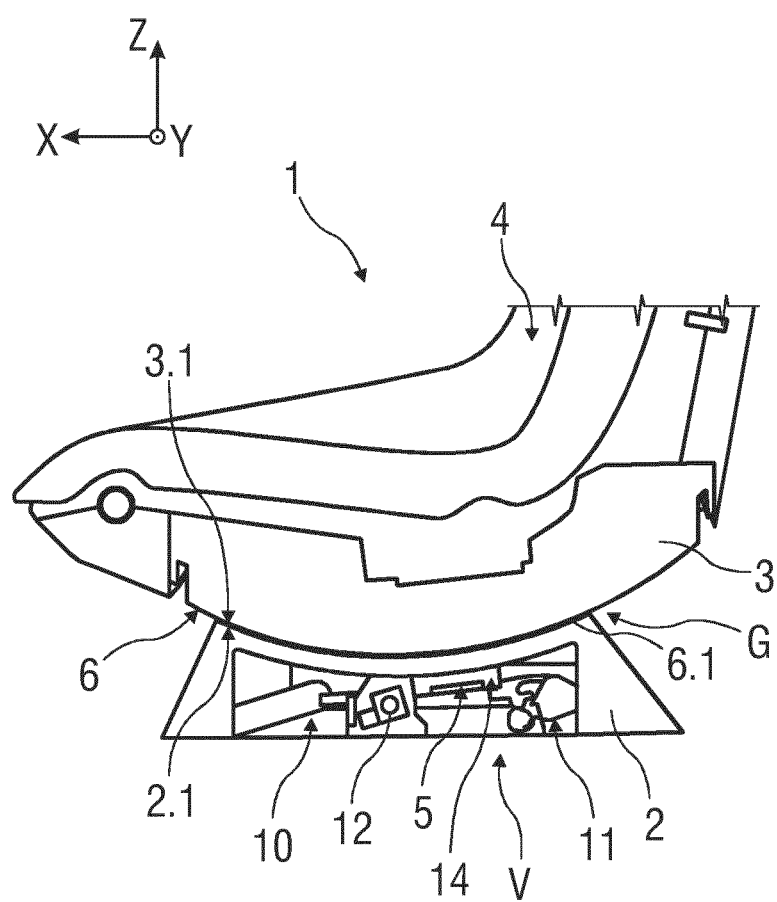
FIG. 2 shows a schematic sectional illustration of an adjustment mechanism in the manner of a spherical plain bearing, in particular a ball and socket joint bearing or plain bearing, for a pivoting or floating seat.

FIG. 2 shows a schematic sectional illustration of an exemplary embodiment of an adjustment mechanism 6 in the manner of a plain bearing G with a split plain bearing 6.1 for the pivoting or floating seat 1. The floating seat 1 comprises the base element 2 for fastening to a body in a vehicle.

For the locking or unlocking of the adjustment mechanism 6 and thus for the adjustment of the floating seat 1, the latter comprises a locking mechanism 5.

The base element 2 is configured in such a manner that it can receive further conventional functional elements, such as a longitudinal adjustment unit 10 and/or a vertical adjustment unit 11 with an associated drive unit 12, for adjusting the floating seat 1 in one or more degrees of translation freedom T1 and T2 in the longitudinal direction X or vertical direction Z.

For example, the plain bearing or spherical plain bearing G has a spherical sliding surface 2.1 in which a spherical running surface 3.1 slides.

The spherical sliding surface 2.1 is formed here on the base element 2 in the direction of the seat shell 4. In the exemplary embodiment shown, the spherical mating or running surface 3.1 is formed on the adapter element 3.

Alternatively, the seat shell 4 itself can have a running surface corresponding to the spherical sliding surface 2.1 of the base element 2. For example, the spherical sliding surface 2.1 has a concave shape and the spherical running surface 3.1 has a convex shape corresponding thereto.

The split plain bearing 6.1 can also be designed as a spherical plain bearing G, a ball and socket joint or a self-aligning bearing. The self-aligning bearing here has, for example, a self-aligning or swinging shell or ball and socket joint socket in which a joint head or a spherical shell rolls.

In the unlocked state of the locking mechanism 5, the seat shell 4 is movable, in particular pivotable or inclinable, relative to the base element 2 in a plurality of degrees of freedom F1 to F3, in particular in all degrees of rotational freedom R1 to R3. In the locked state, the seat shell 4 is blocked in relation to the base element 2 and is not adjustable.

Figure 3:
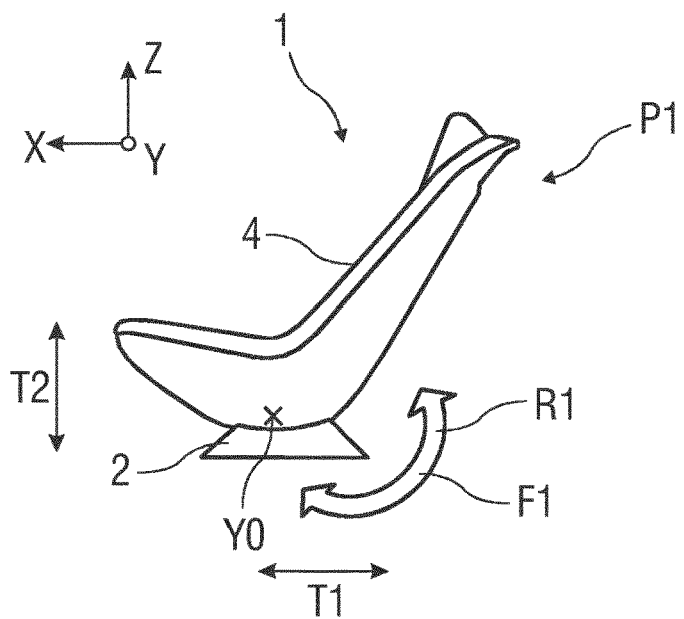
FIGS. 3 to 5 show a schematic perspective illustration of a pivoting or floating seat in various positions and with various settable degrees of freedom.
Figure 4:
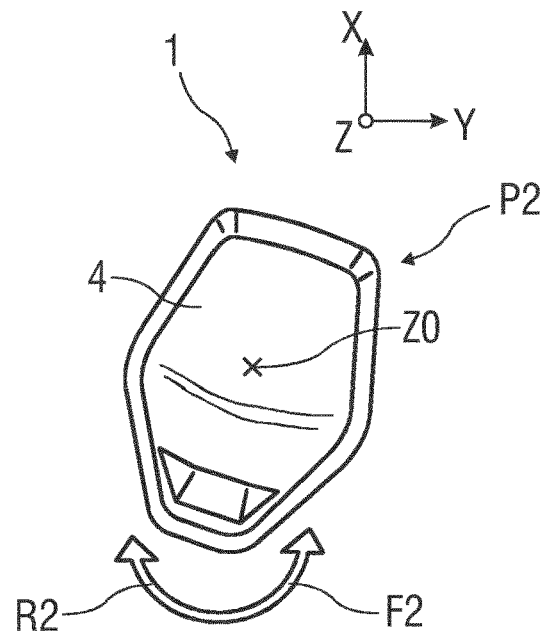
Figure 5:
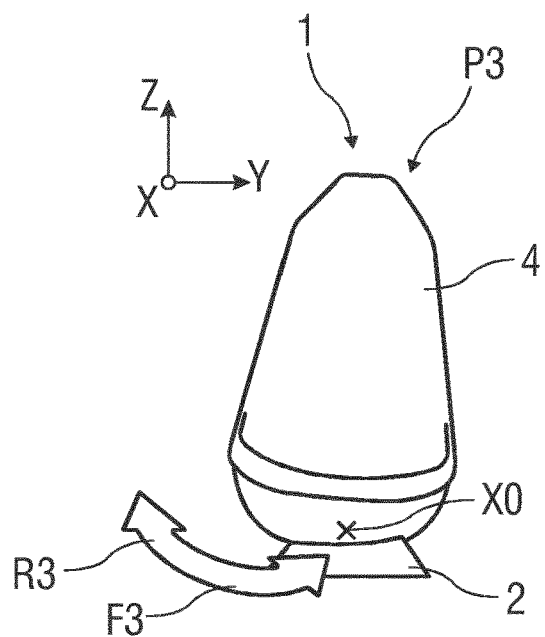

FIGS. 3 to 5 show a schematic perspective illustration of the floating seat 1 in various positions P1 to P3 and with various settable degrees of freedom F1 to F3, in particular the degrees of rotational freedom R1 to R3.

The floating seat 1 can be settable, for example, in at least one or more degrees of translation freedom T1, T2, such as, for example, in the vertical direction Z, in the longitudinal direction X or in the transverse direction Y, and/or in at least one or more degrees of rotational freedom R1 to R3, for example in a vertical direction of rotation or horizontal direction of rotation about a vertical, longitudinal and/or transverse axis. For this purpose, for example, the adjustment mechanism 6 is provided. By setting one of the positions P1 to P3 of the seat shell 4 in more than two degrees of freedom F1 to F3, in particular degrees of rotation R1 to R3, the impression is produced of a floating seat shell 4 which follows a movement of a user on the floating seat 1.

FIG. 3 shows the floating seat 1 in a position P1 which is slightly inclined or pivoted rearward in the longitudinal direction X and in which the seat shell 4 can be inclined about the transverse axis Y0 between a normal position and a comfort position, in particular in a sitting or reclining comfort position, within a range of 0° to at maximum 180° in relation to the normal position, in particular a substantially perpendicular position of the seat back 4.2.

FIG. 4 shows the floating seat 1 in a position P2 rotated about a vertical axis Z0 in relation to a normal position in which the floating seat 1 is oriented, for example, in a vehicle in the travel direction. The adjustment mechanism 6 here is configured to rotate or to pivot the floating seat 1 between the normal position and a rotated position within a range of up to at maximum 20°.

FIG. 5 shows the floating seat 1 in a position P3 which is slightly inclined or pivoted to the side about the longitudinal axis X0 and in which the seat shell 4 can be inclined or rolled about the longitudinal axis X0 between a normal position and a position inclined to the side, within a range of up to at maximum 5° in relation to the normal position, in particular in relation to a substantially horizontal position of the seat part 4.1.

Figure 6:
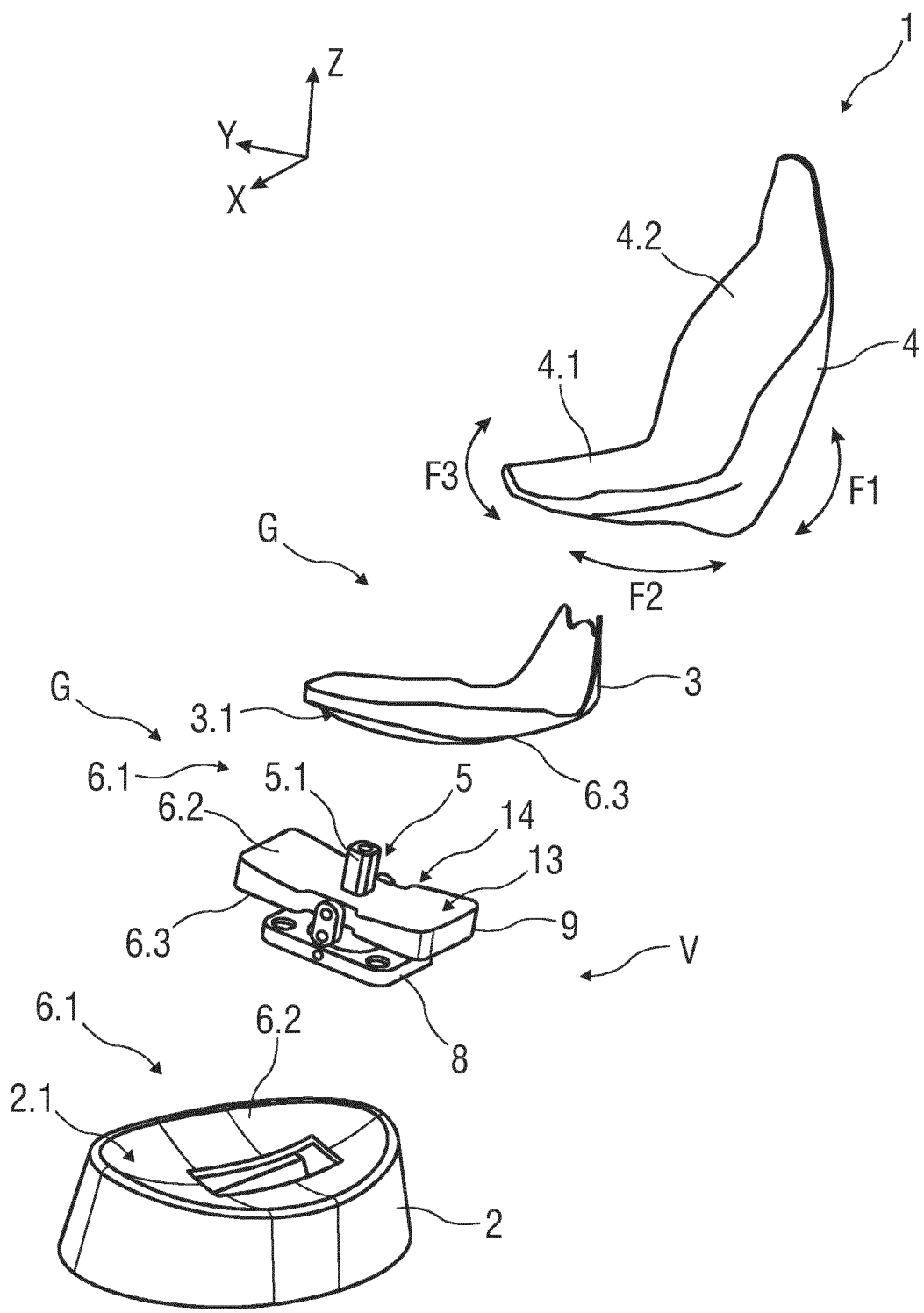
FIG. 6 shows a schematic exploded illustration of a pivoting or floating seat.

FIG. 6 shows a schematic exploded illustration of the pivoting or floating seat 1, comprising at least the base element 2, the adapter element 3 and the seat shell 4. The locking mechanism 5 with an integrated brake unit 14 is arranged between the base element 2 and the adapter element 3. The brake unit 14 is designed, for example, as a wedge brake unit 13 which can comprise a brake element 9, in particular a brake shell or brake plate.

The locking mechanism 5 is actuable, in particular lockable or unlockable, by means of a triggering mechanism 7 (illustrated in FIGS. 7A to 10). The triggering mechanism 7 can be designed to be electrical, for example, for normal adjustment of the seat shell 4 by means of a user and therefore during normal operation and can comprise a servomotor 7.1 (illustrated in FIGS. 7A to 7C). For automatic locking of the seat shell 4 in the event of a collision of the vehicle, the triggering mechanism 7 additionally comprises a pyrotechnic propellant 7.4 by means of which the seat shell 4 is automatically locked within a few milliseconds, in particular fewer than 10 ms, against a movement (illustrated in FIGS. 8A to 10).

For example, the triggering mechanism 7 in conjunction with the locking mechanism 5 is configured in order to electrically lock or unlock an adjustment of the seat shell 4 during normal operation (illustrated by way of example in FIGS. 7A to 7C) and optionally to reversibly lock the adjustment of the seat shell 4 in the event of a collision (illustrated by way of example in FIGS. 8A to 10).

By means of the locking mechanism 5, the seat shell 4, in particular the adjustment mechanism 6 thereof, can be decoupled from the base element 2 and blocked or fixed against an adjustment relative to the base element 2.

A fastening element 8, for example a fastening plate or fastening foot, is provided for fastening the adjustment mechanism 6. The fastening element 8 is fastenable in or to the base element 2.

The floating seat 1 is designed, for example, in such a manner that a position of the seat shell 4 is settable in at least two or more degrees of freedom F1 to F3.

The floating seat 1 can optionally be provided here with a rail system for a longitudinal adjustment unit 10 in order to be able to be adjusted, for example, in the longitudinal direction X and therefore in the translation direction.

The adjustment mechanism 6 is designed for adjusting the seat shell 4 in the degrees of rotational freedom R1 to R3, for example in the manner of a split plain bearing 6.1 or plain bearing or spherical plain bearing G. For example, the split plain bearing 6.1 has a spherical sliding surface 6.2 in which a running surface 6.3 slides. The spherical sliding surface 6.2 can be formed on the base element 2 in the direction of the seat shell 4, wherein the seat shell 4 itself (not illustrated) or the adapter element 3 has a running surface 6.3 corresponding to the spherical sliding surface 6.2 of the base element 2.

In addition, a separate brake element 9, in particular a friction/brake plate or friction/brake shell or skate plate, can be provided between the adapter element 3 and the base element 2. The brake element 9 can have, in the direction of the adapter element 3, a brake surface which corresponds to the running surface 3.1 of the adapter element 3, and, in the direction of the base element 2, can have a running surface 6.3 which corresponds to the sliding surface 2.1 of the base element 2.

In a further embodiment, the plain bearing G and in particular the respective split plain bearing 6.1 between the base element 2 and the brake element 9 and between the brake element 9 and the adapter element 3 and between the adapter element 3 and the seat shell 4 can be designed as a self-aligning bearing. The self-aligning bearing here has, for example, a self-aligning or swinging shell with a corresponding sliding surface 6.2. In the unlocked state, the seat shell is therefore movable, in particular pivotable or inclinable, in a plurality of degrees of freedom F1 to F3. In the locked state, the seat shell 4 and therefore the floating seat 1 are blocked.

Figure 7A:
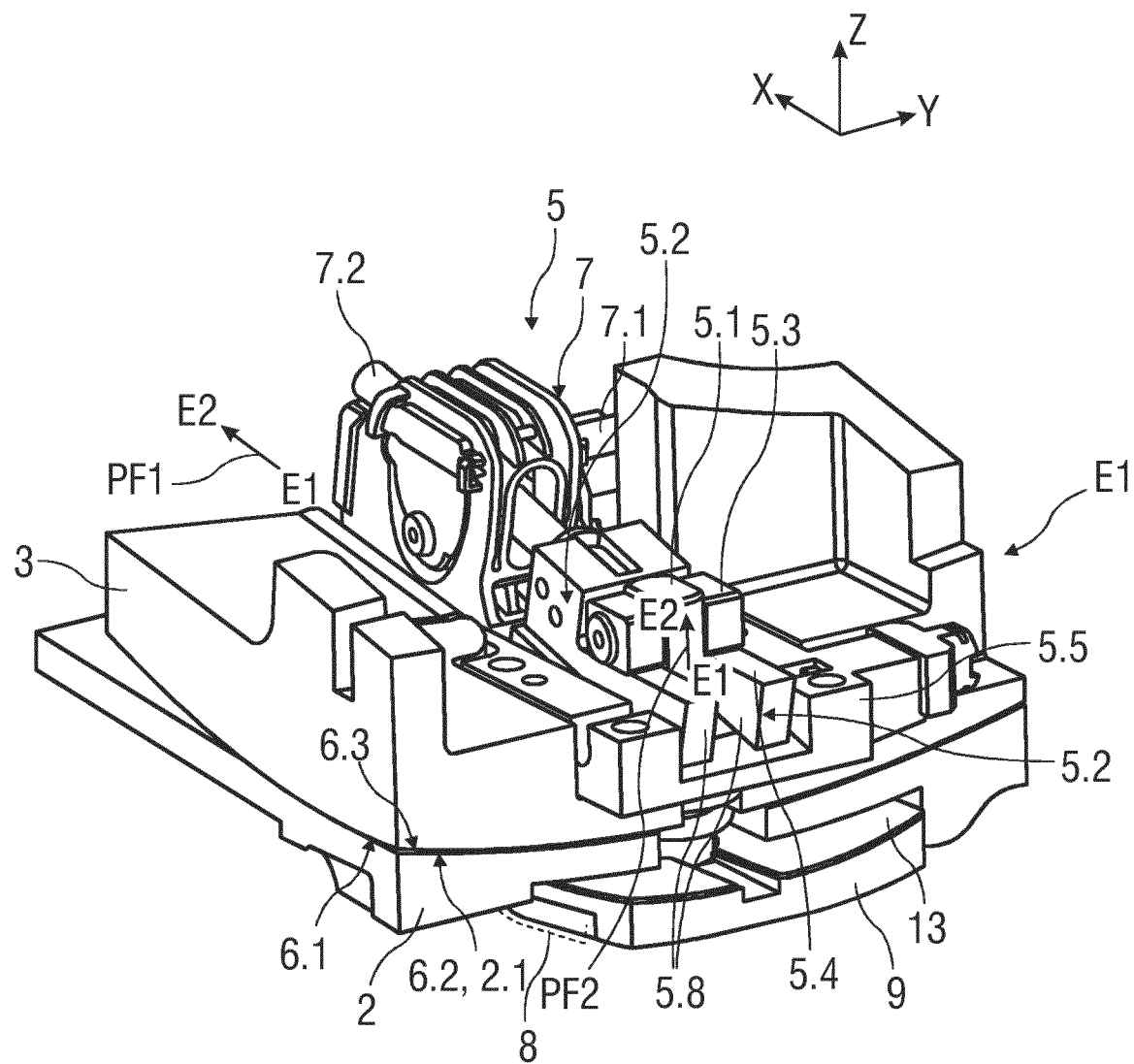
FIGS. 7A to 7C show a schematic perspective illustration of a locking mechanism for a pivoting or floating seat during normal operation in an unlocked position.

FIG. 7A shows a schematic perspective illustration of an exemplary embodiment of a locking mechanism 5 for a floating seat 1 during normal operation in an unlocked position E1 with an electric trigging mechanism 7 for actuating the locking mechanism 5 during normal operation, in particular when a user wishes to adjust the floating seat 1.

The locking mechanism 5 is designed in particular as a mechanical connection, for example a latching connection, a plug-in connection or another suitable form-fitting or force-fitting connection.

For example, the locking mechanism 5 comprises a locking element, for example a locking bolt 5.1, which is adjustable or is adjusted into a locked position E2 by means of an adjustment element 5.2. For this purpose, the locking bolt 5.1 is arranged and mounted on the adjustment element 5.2, for example, by means of a carriage 5.3. The locking bolt 5.1 is fastened to the carriage 5.3, for example, by means of a peg.

The carriage 5.3 is arranged movably on a guide surface 5.4 of the adjustment element 5.2, in particular on a wedge element or a wedge plate. The adjustment element 5.2 is movably arranged, in particular guided, for example arranged in a pullable manner (during normal operation) or pushable manner (in the event of a collision), on an, in particular oblique or wedge-shaped, guide surface 5.7 of a carrier element or main element 5.5.

Figure 7B:
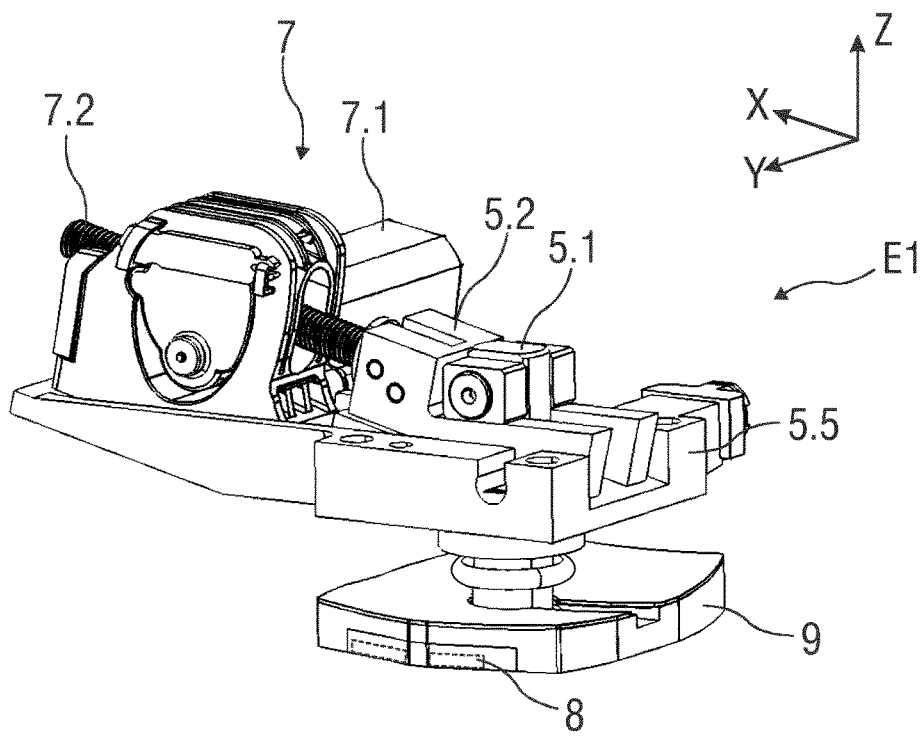

FIG. 7B shows the unlocked position E1 of the floating seat 1, in which the adjustment element 5.2 and therefore the locking bolt 5.1 are adjusted into a lower unlocked position E1 in which the seat shell 4 can be freely moved. The adjustment element 5.2 and therefore the locking bolt 5.1 are adjusted here into a lower unlocked position E1 with respect to the base element 2, in which position the brake element 9 and the seat shell 4 are released, for example are decoupled from each other and have no contact, and are thus not locked, and therefore the seat shell 4 can be moved freely relative to the base element 2.

Figure 7C:
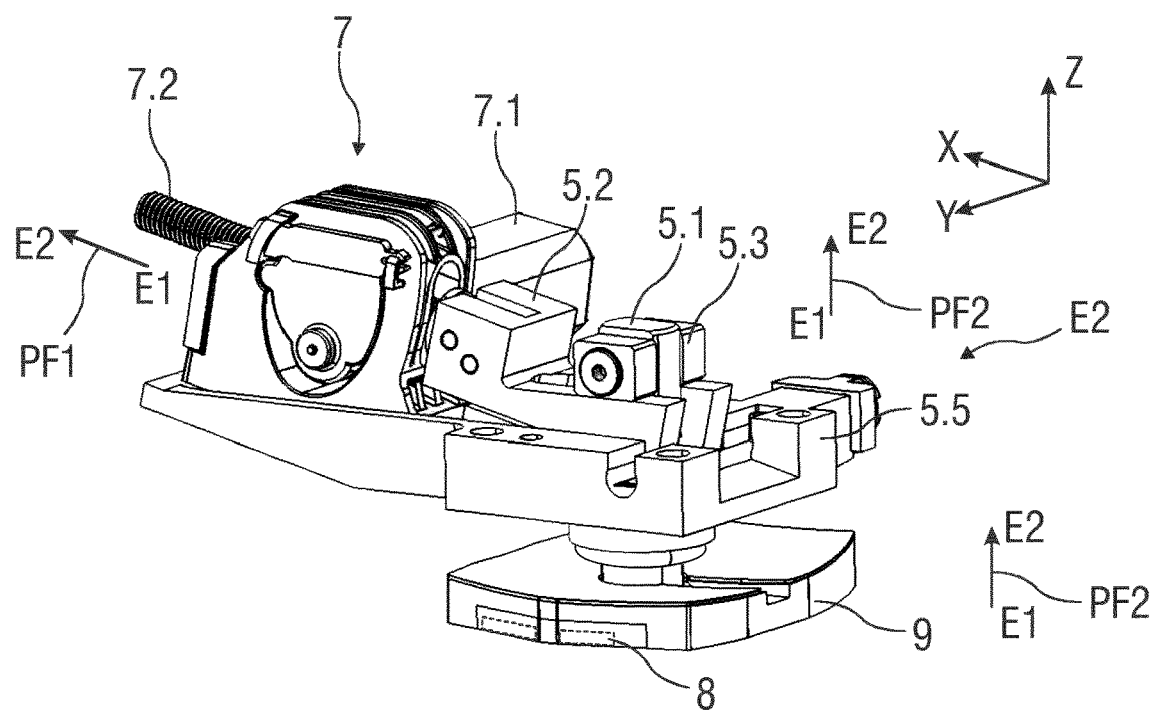

FIG. 7C shows the locked position E2 of the floating seat 1, in which the adjustment element 5.2 and therefore the locking bolt 5.1 are adjusted into an upper locked position E2 with respect to the base element 2. By this means, the brake element 9 and the seat shell 4 are locked relative to the base element 2, in particular by means of a frictional and force-fitting connection. The seat shell 4 thus cannot be moved freely. In order to actuate the locking mechanism 5, in particular the adjustment element 5.2, during normal operation, the floating seat 1 has a triggering mechanism 7, in particular a servomotor 7.1.

In order to lock the floating seat 1, the servomotor 7.1 drives a threaded rod 7.2, in particular a spindle, by means of which the adjustment element 5.2, in particular a wedge plate, is adjusted, for example is movable or is moved in the direction of the servomotor 7.1 according to arrow PF1 from the unlocked position E1 into the locked position E2. Owing to a wedge shape 5.8 of the adjustment element 5.2, the locking element, in particular the locking bolt 5.1, is moved, in particular raised, into the locked position E2, as is shown with reference to arrow PF2. By this means, the fastening element 8 and the brake element 9 are raised such that the brake element 9 and the seat shell 4 are locked to each other and no more relative movements are possible.

The adjustment element 5.2 is designed, for example, as a guide or brake element 9, in particular a carriage 5.3 or a wedge plate or latching plate or a brake cushion or brake block. The adjustment element 5.2 is arranged in a sliding manner on the main element 5.5 of the locking mechanism 5 and is adjustable, in particular displaceable, relative thereto.

The locking element, such as the locking bolt 5.1, can pass here into or out of locking engagement with respect to the adjustment mechanism 6 and the main element 5.5 and the base element 2, depending on the direction of movement according to arrow PF2.

Figure 8A:
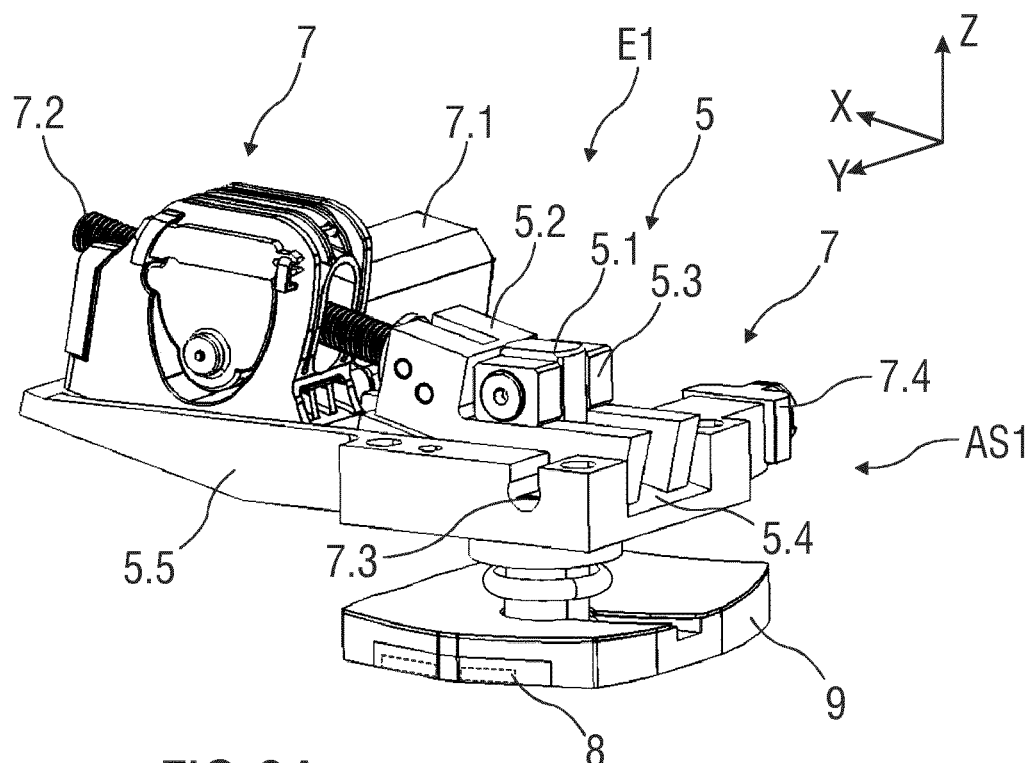
FIGS. 8A to 8C show a schematic perspective illustration and partially sectioned illustration of a locking mechanism for a pivoting or floating seat in an unlocked position and with a triggering mechanism, comprising a pyrotechnic propellant, for automatically triggering the locking mechanism in the event of a collision.
Figure 8B:
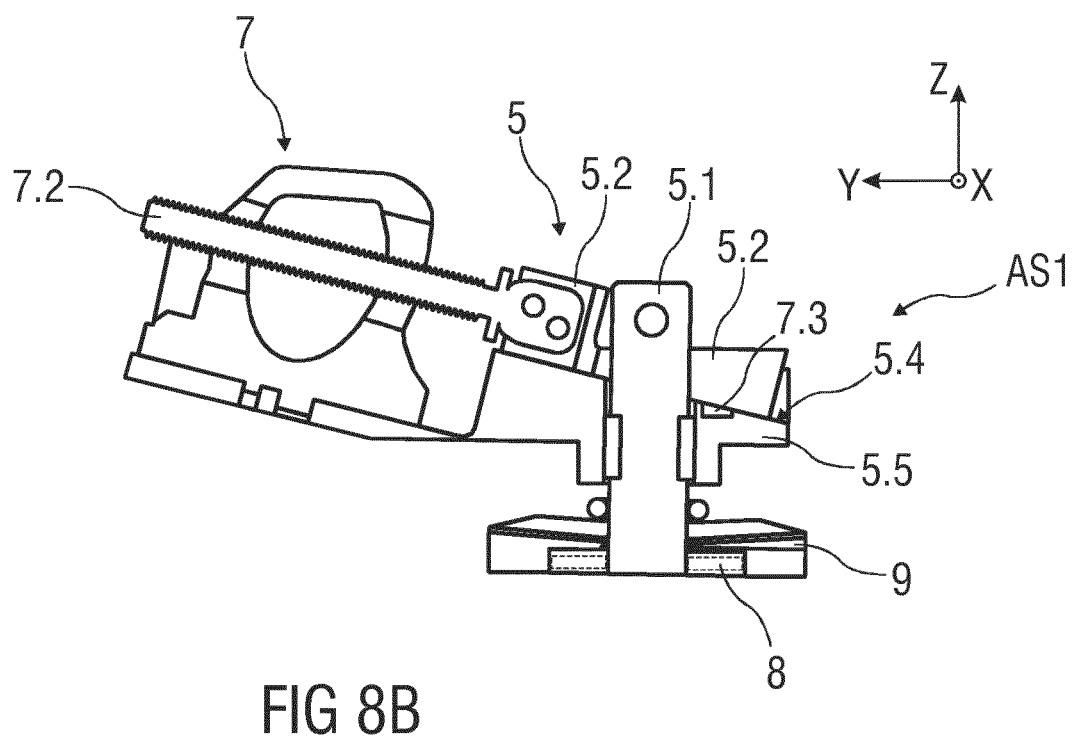
Figure 8C:
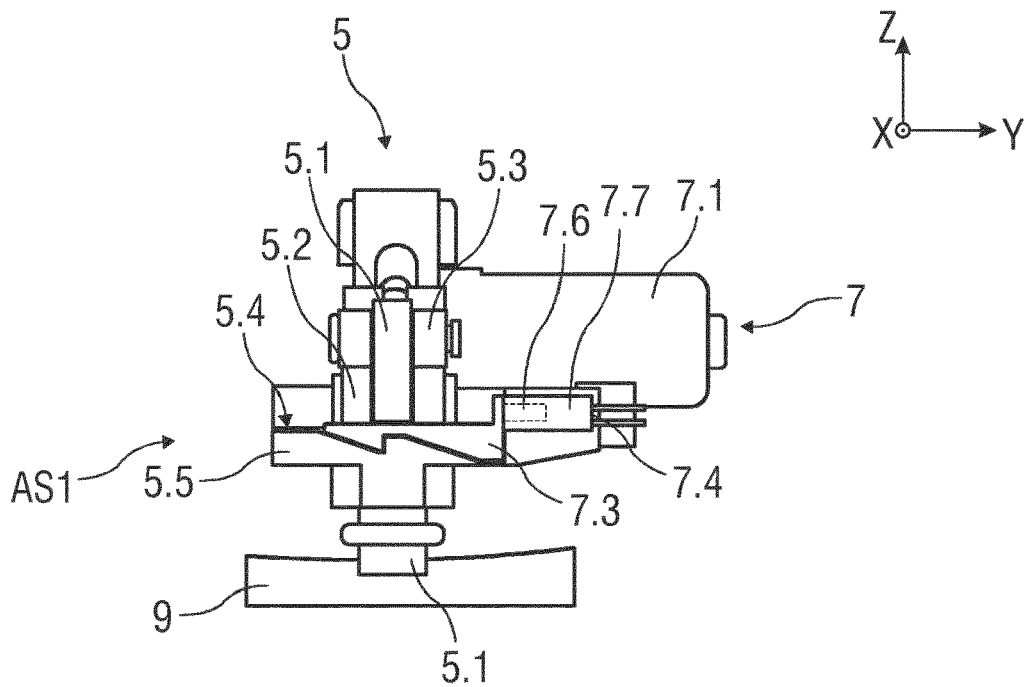

FIGS. 8A to 8C show schematically, perspectively and partially sectioned in the longitudinal and transverse direction, the locking mechanism 5 for the floating seat 1 in an unlocked position E1 in which the pyrotechnic propellant 7.4 has not yet been triggered for the automatic triggering. A wedge element 7.3 which is driven by the propellant 7.4 in the event of a collision is therefore arranged in a starting position AS1. In said starting position AS1, the wedge element 7.3 is in a plane with the guide surface 5.4, and therefore the adjustment element 5.2 and the locking bolt 5.1 are arranged in an unlocked position E1.

FIGS. 9A to 9D show a schematic perspective illustration, partially sectioned in the longitudinal and transverse direction, of the locking mechanism 5 for the floating seat 1 in a locked position E2 in which the pyrotechnic propellant 7.4 has triggered for the automatic triggering. The wedge element 7.3 has therefore been driven by the propellant 7.4, which has been triggered because of an identified collision, and has been brought into a triggering position AS2. In said triggering position AS2, the wedge element 7.3 has been raised beyond the plane of the guide surface 5.4 such that the adjustment element 5.2 and the locking bolt 5.1 are brought automatically into the locked position E2.

Figure 9A:
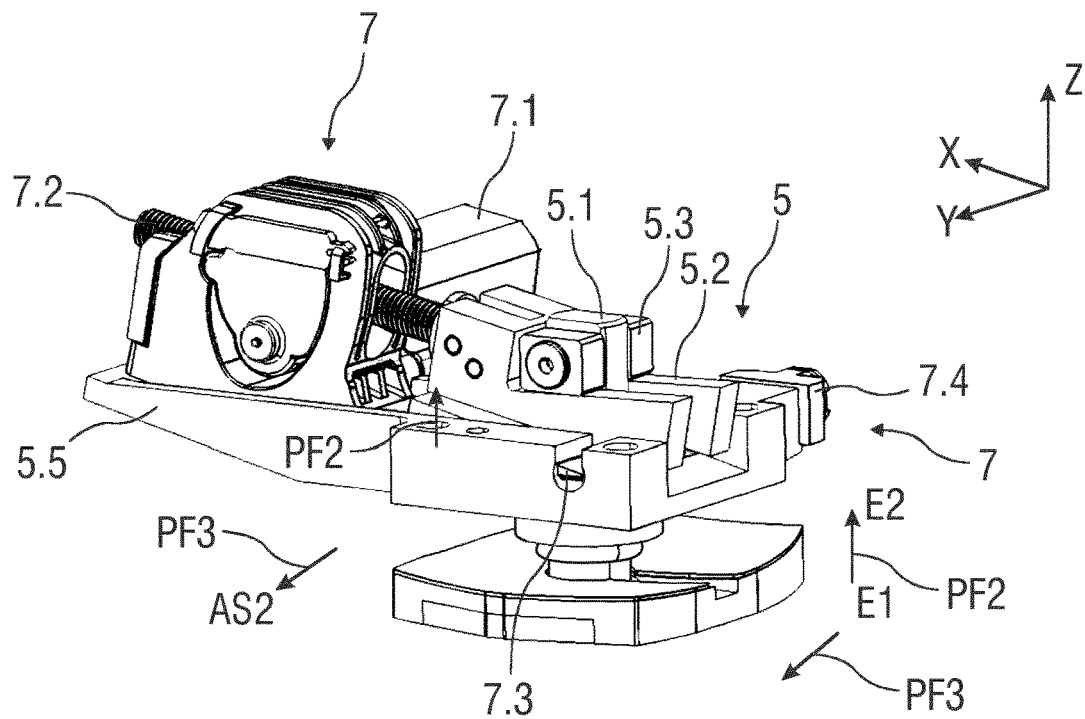
FIGS. 9A to 9D show a schematic perspective and partially sectioned illustration of a locking mechanism for a pivoting or floating seat in a locked position triggered by a collision.
Figure 9B:
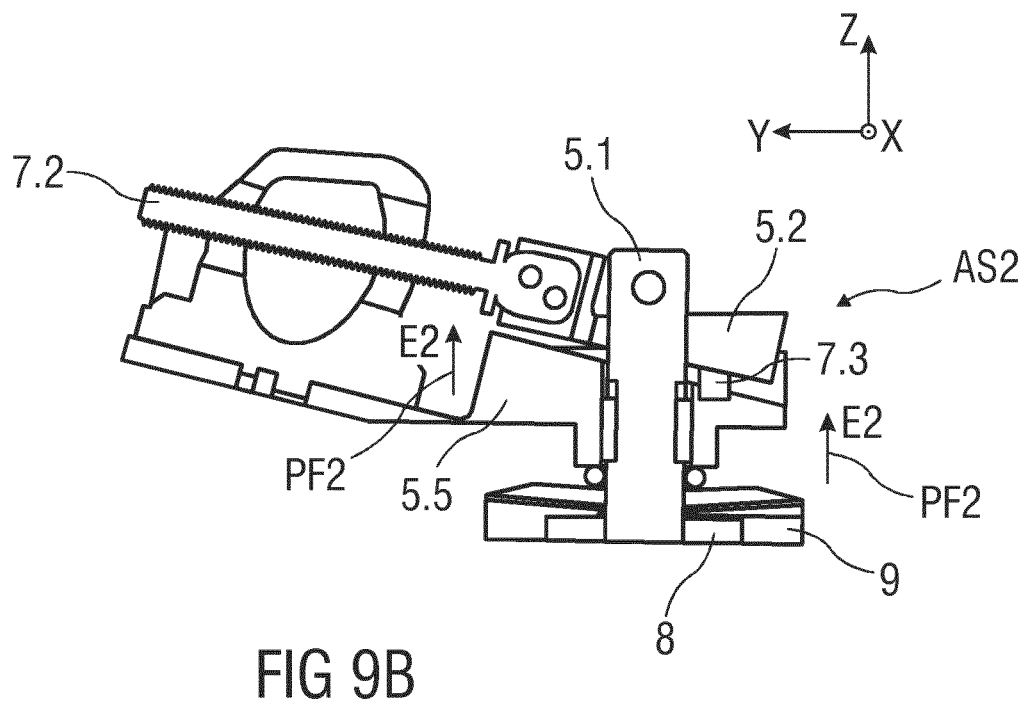
Figure 9C:
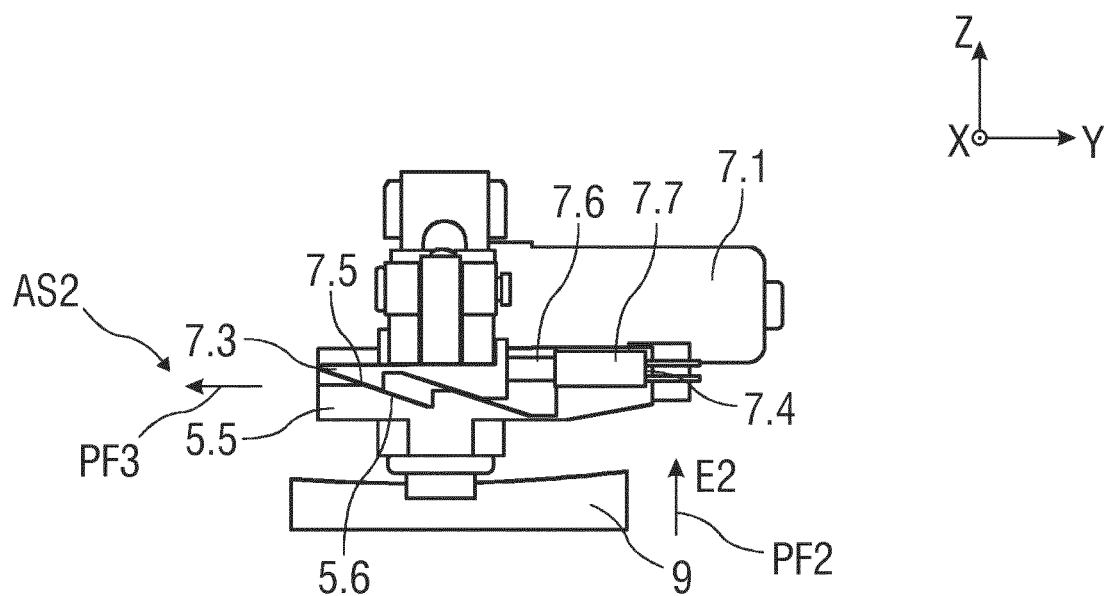
Figure 9D:
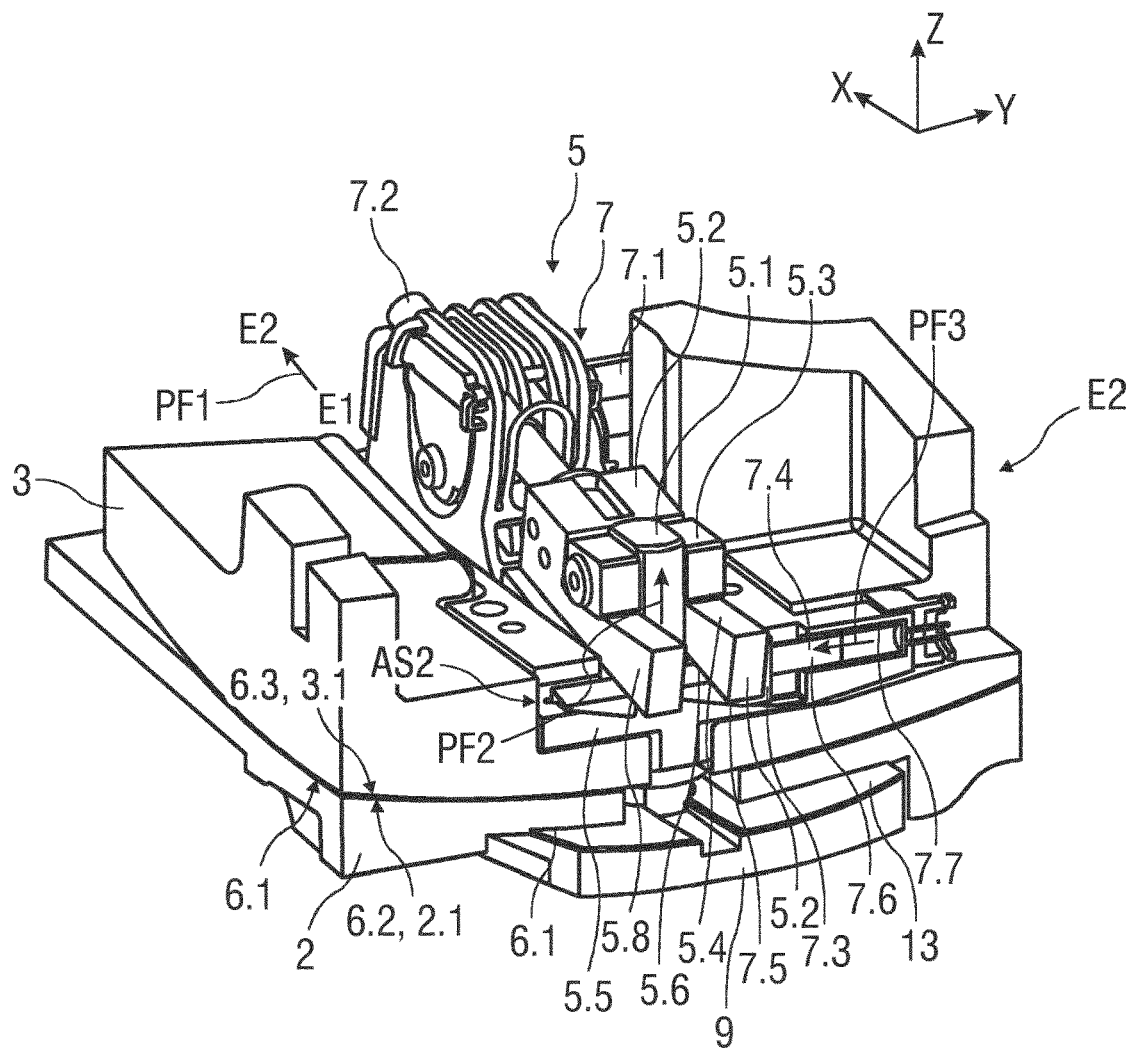

FIG. 9A shows a schematic perspective illustration of the locking mechanism 5 for the floating seat 1 in the position E2 which is locked because of a collision and is in particular raised and in which the fastening element 8 and the brake element 9 are raised and the seat shell 4 is locked.

In addition to the actuating of the locking mechanism 5 in the event of a collision, the triggering mechanism 7 comprises the adjustable wedge element 7.3 which is adjustable into the triggering position AS2 and therefore into a locking position by means of the pyrotechnic propellant 7.4 when the latter is triggered in the event of a collision. The wedge element 7.3 is arranged in particular between the main element 5.5 of the locking mechanism 5 and the adjustment element 5.2 for normal operation.

In the event of a collision, the wedge element 7.3 is adjusted, in particular advanced or moved, according to arrow PF3 by triggering of the pyrotechnic propellant 7.4. The wedge element 7.3 has at least one wedge surface 7.5 which slides on a corresponding sliding surface 5.6 of the main element 5.5 (as shown in the sectional illustration in FIGS. 8C and 9C). By means of the movement of the wedge element 7.3 between the adjustment element 5.2 and the fixed main element 5.5, the adjustment element 5.2 is moved according to arrow PF2, in particular raised, in the vertical direction Z and consequently so too is the locking bolt 5.1 into the locked position E2. The pyrotechnic propellant 7.4 is, for example, a linearly acting propellant.

Figure 10:
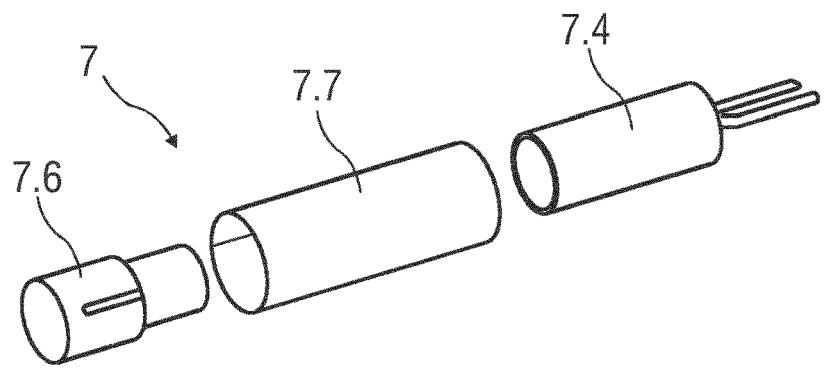
FIG. 10 shows a schematic exploded illustration of an exemplary embodiment of a pyrotechnic propellant with a piston for a triggering mechanism.

FIG. 10 shows a schematic exploded illustration of an exemplary embodiment of a triggering mechanism 7 which triggers in the event of a collision and is in the form of a pyrotechnic propellant 7.4 in order to automatically trigger the locking mechanism 5 and to adjust same into a locking position or locked position E2.

The pyrotechnic propellant 7.4 is designed as a pyrotechnic actuator which advances a piston 7.6 which moves, in particular raises, the locking bolt 5.1 indirectly via the wedge element 7.3 interacting with the adjustment element 5.2. The wedge element 7.3 is moved here according to arrow PF3, as a result of which the adjustment element 5.2 and, with the latter, the locking bolt 5.1 are moved according to arrow PF2.

The pyrotechnic propellant 7.4 can optionally be surrounded by a sleeve 7.7, in particular a protective sleeve.

The advantage of the described triggering mechanism 7 with a separate triggering unit during normal operation and separate triggering unit in the event of a collision consists in particular in that, during normal operation, the seat shell 4 is pivotable, in particular movable, or is lockable, by means of just one operation, in particular a single-button/single-touch operation, and, in the event of a collision, the seat shell 4 is lockable against movement automatically within milliseconds by means of the pyrotechnic propellant 7.4.

In particular, the triggering mechanism 7 can be activated, for example, by means of a simple switch, a touch sensor or gesture sensor, and the adjustment mechanism 6 can be unlocked or locked. This increases the operating comfort. Furthermore, because of the articulated mounting of the seat shell 4 on the base element 2, the floating seat 1 has high sitting and adjustment comfort in the manner of a floating state during the adjustment of the seat.

Figure 11:
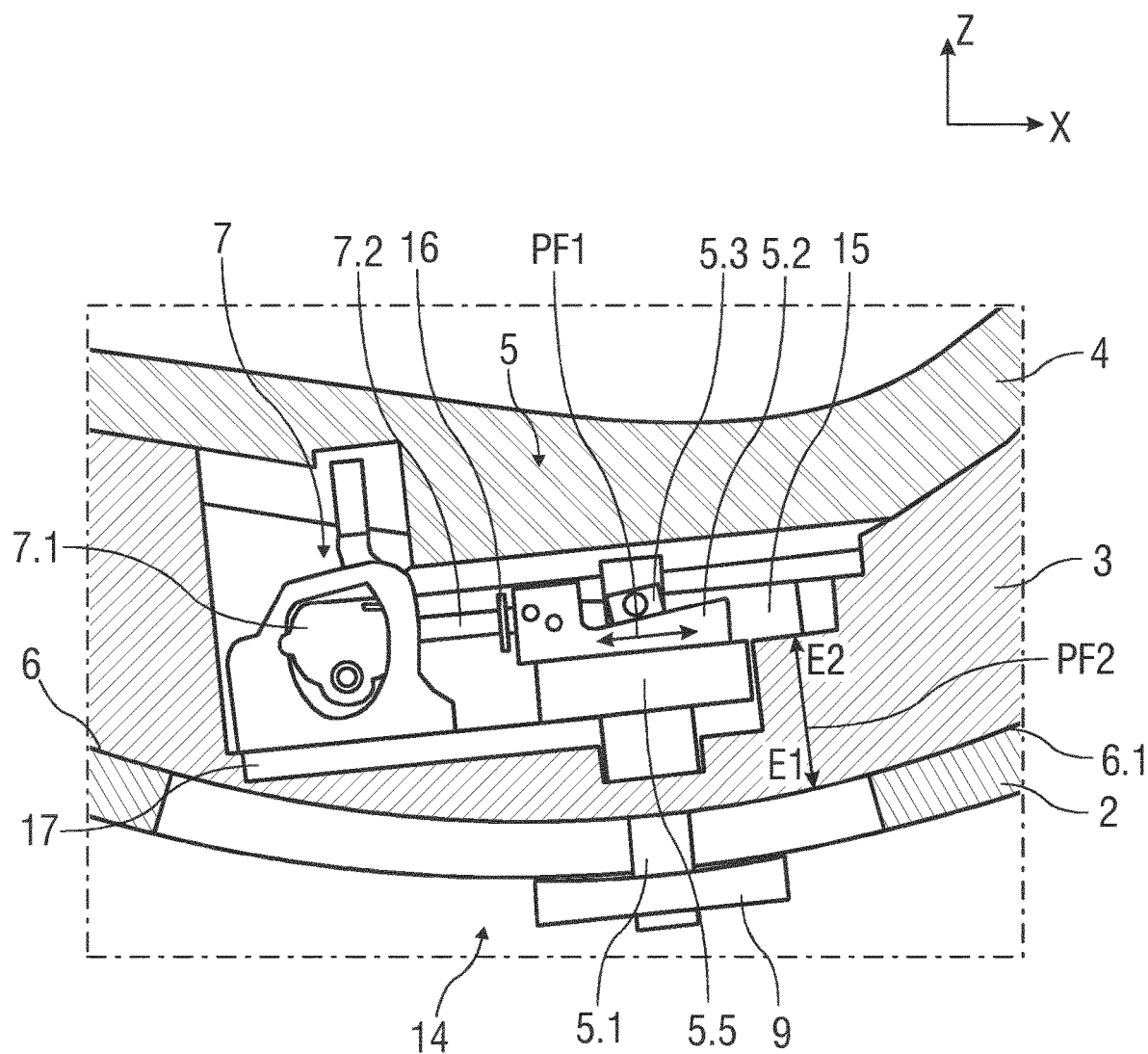
FIG. 11 shows a schematic Z-X sectional illustration of a locking mechanism in conjunction with part of a brake unit for braking and/or locking the movement of a floating seat.

FIG. 11 shows a schematic sectional illustration of a locking mechanism 5 in conjunction with part of a brake unit 14 for braking and/or locking the movement of a floating seat 1 in the X-Z direction. For this purpose, the brake unit 14, as described above, comprises the locking bolt 5.1 which is adjustable in the vertical direction Z between an unlocked position E1 and a locked position E2 (arrow PF2) by means of the adjustment element 5.2 (arrow PF1) which is movable in the longitudinal direction X.

The locking mechanism 5, in particular during normal operation, is designed as a continuous or infinitely variable lock or detent. For this purpose, the locking mechanism 5 has, for example, an electromechanical drive unit, such as the servomotor 7.1, which interacts with the wedge brake unit 13, as is described in more detail below.

The electromechanical drive unit is formed in combination with the wedge brake unit 13 in order at least to brake and/or to stop an adjustment, in particular inclination of the seat shell 4 relative to the base element 2 about the longitudinal, transverse and/or vertical axis X0, Y0 and/or Z0.

The adjustment mechanism 6 with the locking mechanism 5 is arranged on a seat plate 16 of the seat shell 4. In addition, a supporting element 15 can be provided for the seat plate 16 and a carrier element 17 for the servomotor 7.1.

In a further embodiment, the electromechanical drive unit is designed as a motor transmission unit, for example a drive or servomotor in combination with a spindle drive.

Figure 12:
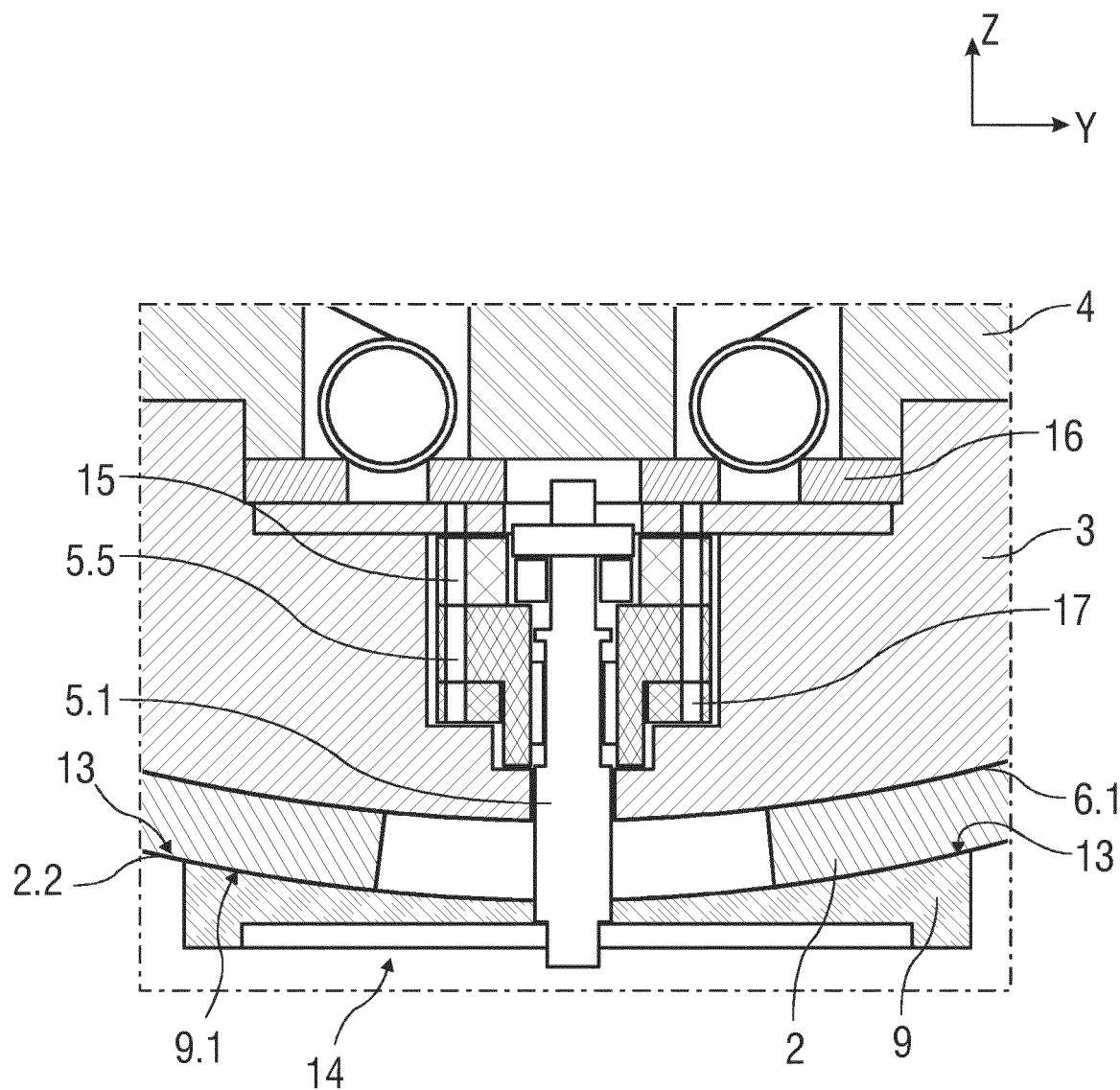
FIG. 12 shows a schematic Z-Y sectional illustration of a locking mechanism in conjunction with part of a brake unit for braking and/or locking the movement of a floating seat.

FIG. 12 shows a schematic sectional illustration of the locking mechanism 5 in conjunction with part of the brake unit 14, in particular the wedge brake unit 13 for braking the movement, in particular inclination, of the floating seat 1.

The wedge brake unit 13 is designed as a friction brake and, for example, is formed by the shape and/or material of surfaces lying against one another of the base element 2 and of the brake element 9. For example, the surface 2.2 of the base element 2 that faces the brake element 9 is formed from a particularly hard material having a high modulus of elasticity, in particular within a range of 5000 MPa (Rockwell pressure hardness, DIN 2039-1), and the surface 9.1 of the brake element 9 that faces the base element 2 is formed from a soft material having a lower modulus of elasticity of around 70+/−10 Shore A (according to DIN 53505) and high elasticity, or vice versa.

For example, the base element 2 is formed from polyamide and the brake element 9 from ethylene-propylene-diene rubber (called EPDM for short). In addition, at least one of the surfaces 2.2 or 9.1 can be roughened. In particular, the surface 2.2 or 9.1 that is formed from a harder material is roughened. For example, the surface 2.2 is provided with a surface profile or a surface structure with a depth of between 0.2 mm and 0.8 mm. Both the base element 2 and the brake element 9 can also be formed from a hard material, wherein one of said elements is provided with a soft or flexible coating and/or a corresponding deep surface structure as the brake layer.

In other words: the wedge brake unit 13 comprises, for example, opposed brake, wedge and/or friction surfaces. For example, a brake surface, for example the surface 9.1, has a spherical shape which slides in a damped manner onto an oppositely inclined brake, sliding or guide surface, for example the surface 2.2, and is thereby braked and stopped until no more relative movements occur, and is thus locked. In addition, one of the surfaces 2.2 or 9.1 or both can be provided with a brake layer (for example of a softer material) and/or with a brake profile (roughening).

Figure 13:
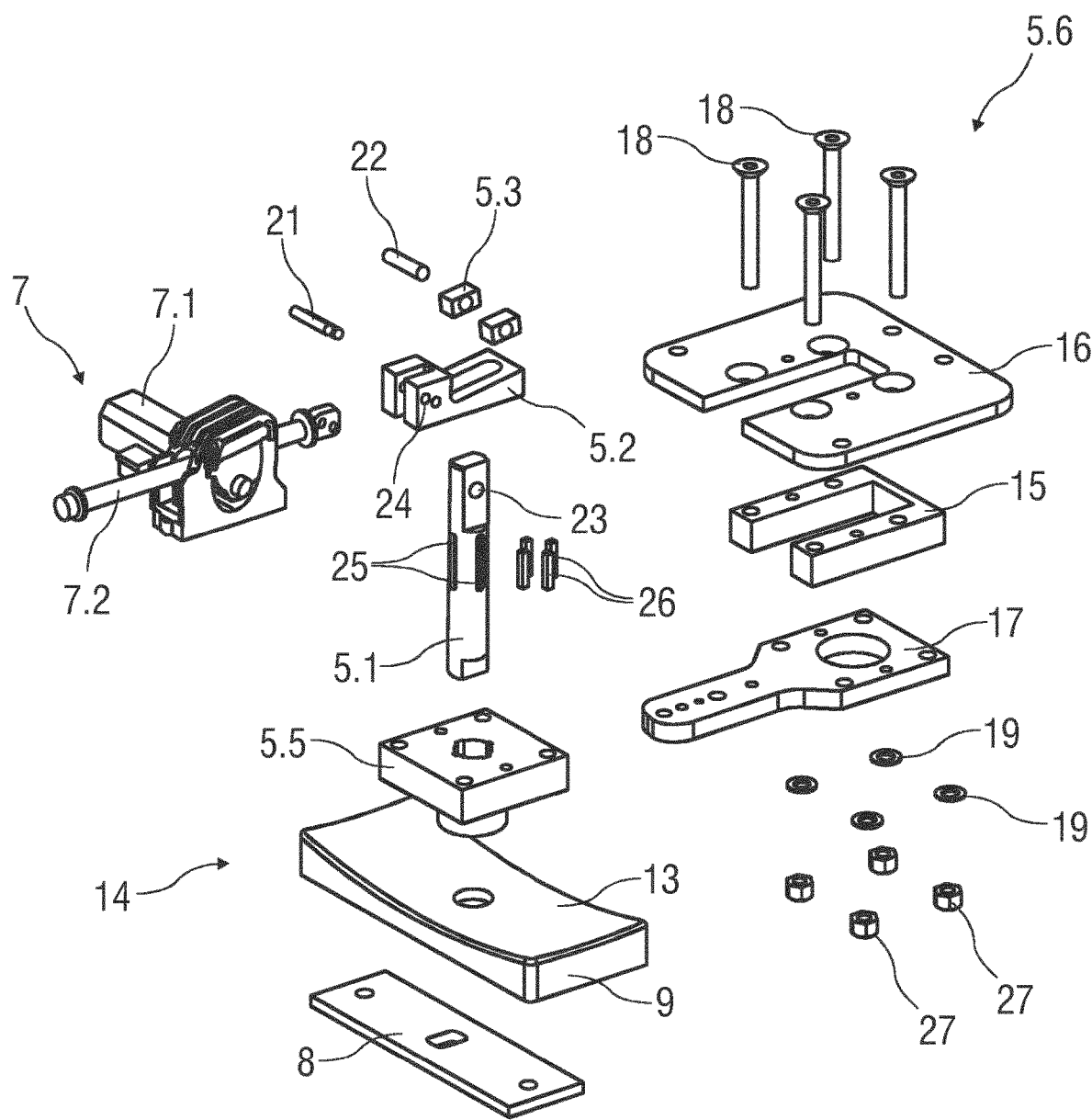
FIG. 13 shows a schematic exploded illustration of components of a combined adjustment and locking mechanism with an integrated wedge brake unit for a floating seat.

FIG. 13 shows a schematic exploded illustration of components, such as a servomotor 7.1 with a threaded rod 7.2, a wedge element or adjustment element 7.3, 5.2, a slider or carriage 5.3, a locking bolt 5.1, a bearing element or main element 5.5 for the locking bolt 5.1, a brake element 9, a fastening element 8 and a seat plate 16, a supporting element 15 for the seat plate 16 and a carrier element 17 for the servomotor 7.1 of a combined locking and adjustment mechanism 5.6 with an integrated wedge brake unit 13 for a floating seat 1. Screws 18, washers 19 and nuts 27 are provided for connecting the components.

The threaded rod 7.2 is held on the wedge element or adjustment element 7.3, 5.2 by means of a peg 21. For this purpose, the adjustment element 5.2 has a corresponding peg opening 24.

The carriages 5.3 are held on the locking bolt 5.1 by means of a pin 22. For this purpose, the locking bolt 5.1 has a corresponding pin opening 23.

In addition, the locking bolt 5.1 can be provided with slots 25 for receiving keys 26.

LIST OF REFERENCE SIGNS

1, 100 pivoting or floating seat
2, 20 base element
2.1 sliding surface
2.2 surface
3, 30 adapter element
3.1 mating or running surface
4, 40 seat shell
4.1 seat part
4.2 seat back
4.3 carrier
4.4 cushion element
5 locking mechanism
5.1 locking bolt
5.2 adjustment element
5.3 slider/carriage
5.4 guide surface
5.5 main element
5.6 sliding surface
5.7 guide surface
5.8 wedge shape
6, 60 adjustment mechanism
6.1 split plain bearing
6.2 sliding surface
6.3 running surface
7 triggering mechanism
7.1 servomotor
7.2 threaded rod
7.3 wedge element
7.4 pyrotechnic propellant
7.5 wedge surface
7.6 piston
7.7 sleeve
8 fastening element
9 brake element
9.1 surface
10 longitudinal adjustment unit
11 vertical adjustment unit
12 drive unit
13 wedge brake unit
14 brake unit
15 supporting element
16 seat plate
17 carrier element
18 screws
19 washer
21 peg
22 pin
23 pin opening
24 peg opening
25 slot
26 key
27 nut
32 surface shape
33 partial sliding surfaces
34 recess
35 fastening bolt
36 fastening flanges
37 seat frame
41 seat part
41.1 sliding surface
42 frame shell
43 attachment points
44 seat belt
45 multiple-surface plain bearing
AS1 starting position
AS2 triggering position
E1 unlocked position
E2 locked position
F1-F3 degrees of freedom
G plain bearing or spherical plain bearing
P1-P3 design position or seat position
PF1-PF1 arrow
R1-R3 degrees of rotational freedom
T1-T2 degrees of translation freedom
V adjustment
X longitudinal direction
Y transverse direction
Z vertical direction
Z0 vertical axis
Y0 transverse axis
X0 longitudinal axis

The invention claimed is:

1. A floating seat, comprising
a base element, and
a seat shell,
wherein an adjustment mechanism in the manner of a plain bearing is formed at least between the seat shell and the base element, wherein the seat shell is adjustable by the adjustment mechanism at least in two degrees of rotational freedom relative to the base element, and
wherein a locking mechanism is provided for locking and/or unlocking an adjustment of the seat shell relative to the base element, wherein the locking mechanism is actuable by a triggering mechanism, and wherein the triggering mechanism is configured to manually or electrically actuate the locking mechanism during normal operation in order to unlock or lock the adjustment of the seat shell relative to the base element and to automatically actuate the locking mechanism in the event of a collision to automatically lock the adjustment of the seat shell relative to the base element.

2. The floating seat as claimed in claim 1, wherein the plain bearing is designed in the manner of a ball and socket joint or split plain bearing or in the form of a multiple-surface plain bearing.

3. The floating seat as claimed in claim 1, wherein the plain bearing is designed to incline the seat shell relative to the base element in the longitudinal direction about a transverse axis within a range of between 0° and 120°, to roll the seat shell in the transverse direction about a longitudinal axis within a range of between 0° and 10°, and/or to rotate the seat shell about a vertical axis within a range of 0° to 360°.

4. The floating seat as claimed in claim 1, wherein an adapter element is arranged between the base element and the seat shell.

5. The floating seat as claimed in claim 4, wherein the adapter element has a spherical shell shape.

6. The floating seat as claimed in claim 1, wherein the locking mechanism fixes the seat shell in an arbitrarily settable position relative to the base element.

7. The floating seat as claimed in claim 6, wherein the locking mechanism is arranged in the adapter element.

8. The floating seat as claimed in 1, wherein the locking mechanism comprises an electromechanical drive unit which interacts with a brake unit which engages elements including the seat shell and/or the base element.

9. The floating seat as claimed in claim 1, wherein the locking mechanism is designed as a continuous or infinitely variable lock.

10. The floating seat as claimed in claim 1, wherein the triggering mechanism for manually or electrically actuating the locking mechanism during normal operation comprises a servomotor.

11. The floating seat as claimed claim 1, wherein the triggering mechanism for automatically actuating the locking mechanism in the event of a collision comprises a pyrotechnic propellant.

12. The floating seat as claimed in claim 11, wherein the triggering mechanism comprises an adjustable wedge element which is adjustable from a starting position into a triggering position by means of the pyrotechnic propellant when the latter is triggered.

13. The floating seat as claimed in claim 12, wherein the wedge element is coupled in terms of movement to the locking mechanism in such a manner that, when the wedge element is adjusted into the triggering position, the locking mechanism automatically locks the seat shell.

14. The floating seat as claimed in claim 13, wherein the wedge element is coupled in terms of movement to the locking mechanism in such a manner that, when the wedge element is adjusted into the triggering position, a locking bolt is automatically raised.

* * * * *